(12) United States Patent
Beck

(10) Patent No.: US 6,832,771 B2
(45) Date of Patent: Dec. 21, 2004

(54) WHEEL BOARD VEHICLE

(75) Inventor: Gregory S. Beck, Anaheim, CA (US)

(73) Assignee: Cassady Engineering, Inc., Anaheim, CA (US)

( * ) Notice: Subject to any disclaimer, the term of this patent is extended or adjusted under 35 U.S.C. 154(b) by 0 days.

(21) Appl. No.: 10/303,414

(22) Filed: Nov. 25, 2002

(65) Prior Publication Data

US 2003/0122335 A1 Jul. 3, 2003

Related U.S. Application Data

(60) Provisional application No. 60/334,366, filed on Nov. 30, 2001.

(51) Int. Cl.$^7$ ................................................ B62M 1/00
(52) U.S. Cl. .............................. 280/87.041; 280/87.042
(58) Field of Search ....................... 280/87.041, 87.042, 280/11.28, 11.27, 11.19, 11.233, 11.26, 87.043, 47.11, 43.1, 40, 645, 646, 651, 652, 655.1, 11.201, 11.221, 263, 267, 11.25

(56) References Cited

U.S. PATENT DOCUMENTS

| | | | |
|---|---|---|---|
| 681,368 A | | 8/1901 | Kent |
| 1,056,357 A | | 3/1913 | Murdock |
| 1,274,889 A | | 8/1918 | Johnson |
| 1,514,720 A | * | 11/1924 | Pauly .................... 280/87.041 |
| 1,707,831 A | * | 4/1929 | Wayerski ............... 280/87.041 |
| 3,484,116 A | * | 12/1969 | Allen ..................... 280/11.201 |
| 3,667,777 A | * | 6/1972 | Enriquez ............... 280/87.042 |
| 3,876,217 A | | 4/1975 | Copier |
| 4,179,134 A | * | 12/1979 | Atkinson ............... 280/87.042 |
| 4,394,029 A | | 7/1983 | Holmgren |
| 4,991,861 A | | 2/1991 | Carn et al. |
| 5,125,687 A | | 6/1992 | Hwang |
| 5,160,155 A | | 11/1992 | Barachet |
| 5,855,385 A | * | 1/1999 | Hambsch ............... 280/87.042 |
| 5,860,657 A | | 1/1999 | Kroher |
| 5,927,420 A | * | 7/1999 | Karrington ............. 280/87.042 |
| 5,984,328 A | | 11/1999 | Tipton |
| 5,997,018 A | * | 12/1999 | Lee ........................ 280/87.042 |
| 6,139,035 A | * | 10/2000 | Tsai ....................... 280/87.041 |
| 6,182,985 B1 | * | 2/2001 | Wang et al. ........... 280/87.041 |
| 6,217,058 B1 | * | 4/2001 | Wang et al. ........... 280/87.041 |
| 6,241,264 B1 | * | 6/2001 | Page ....................... 280/11.19 |
| 6,273,439 B1 | * | 8/2001 | Ray et al. .............. 280/87.041 |
| 6,343,667 B2 | * | 2/2002 | Sauve .................... 280/87.041 |
| 6,398,237 B1 | | 6/2002 | Attey |
| 6,488,295 B1 | * | 12/2002 | Bryant ................... 280/87.042 |
| 6,609,584 B2 | * | 8/2003 | Patmont et al. ........ 280/87.041 |
| 6,676,138 B1 | * | 1/2004 | Rosso .................... 280/11.221 |

* cited by examiner

Primary Examiner—Hau Phan
(74) Attorney, Agent, or Firm—John J. Connors; Connors & Assoc. Inc.

(57) ABSTRACT

A wheel board vehicle includes a frame having thereon a centrally mounted planar board on which a rider stands while riding the vehicle. At a front end of the frame a single support arm extends that has an outer end to which a front yoke is pivotably attached. The front yoke carries a front wheel. At a rear end, stationary support arms carry a rear wheel. A manually operated brake member is attached to the frame near the rear wheel adjacent a leg of the rider while the rider is riding the vehicle, and a stationary handle is attached to the frame and oriented generally vertically while the rider rides the vehicle.

16 Claims, 22 Drawing Sheets

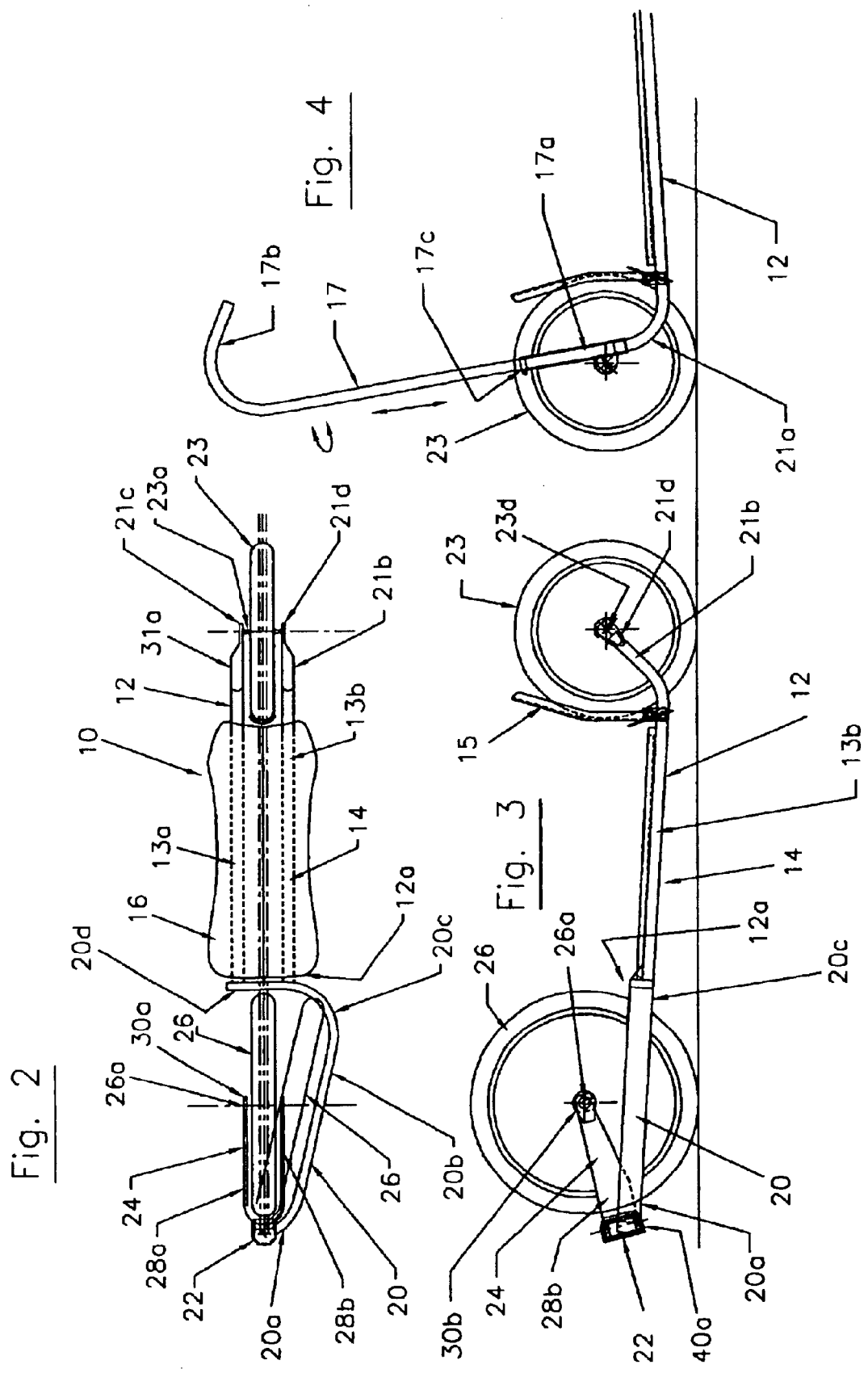

TOP SECTION VIEW

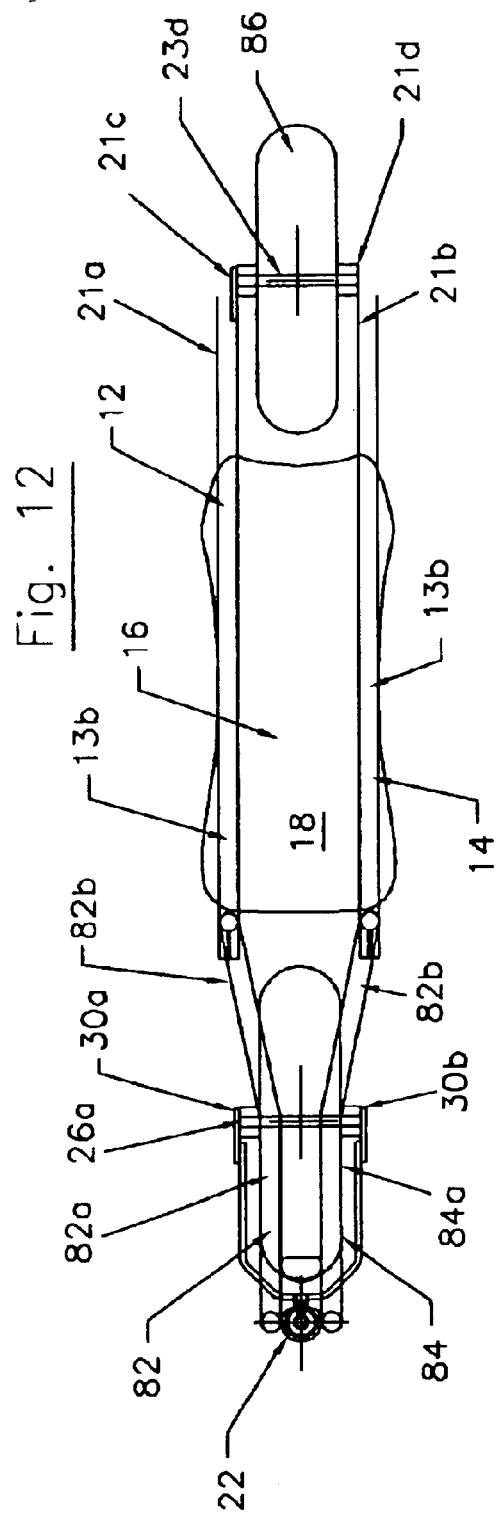
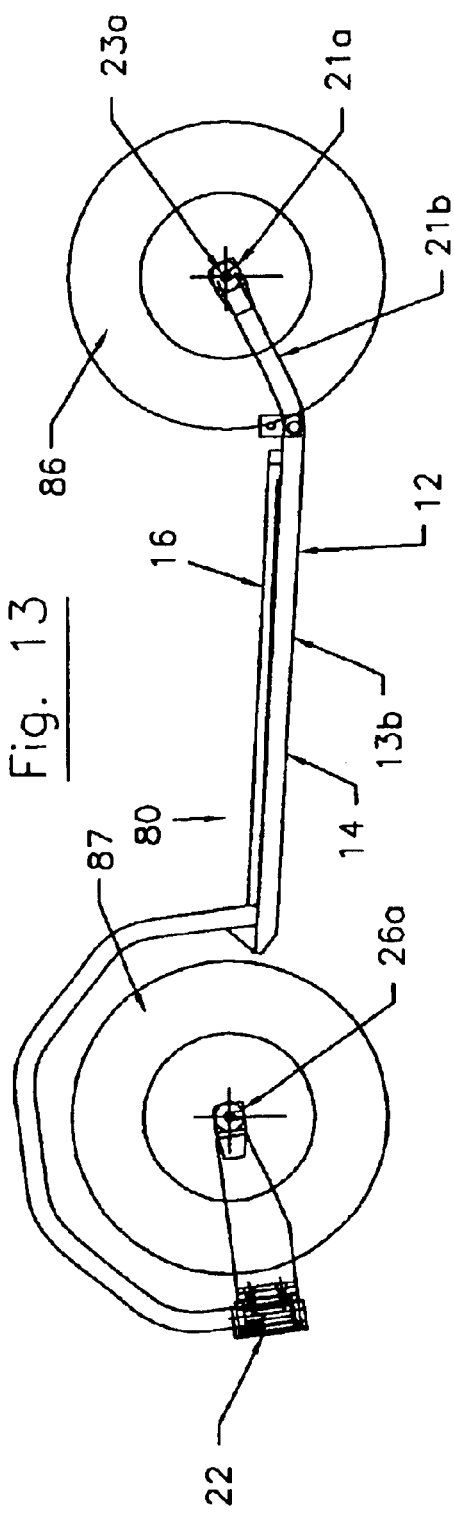

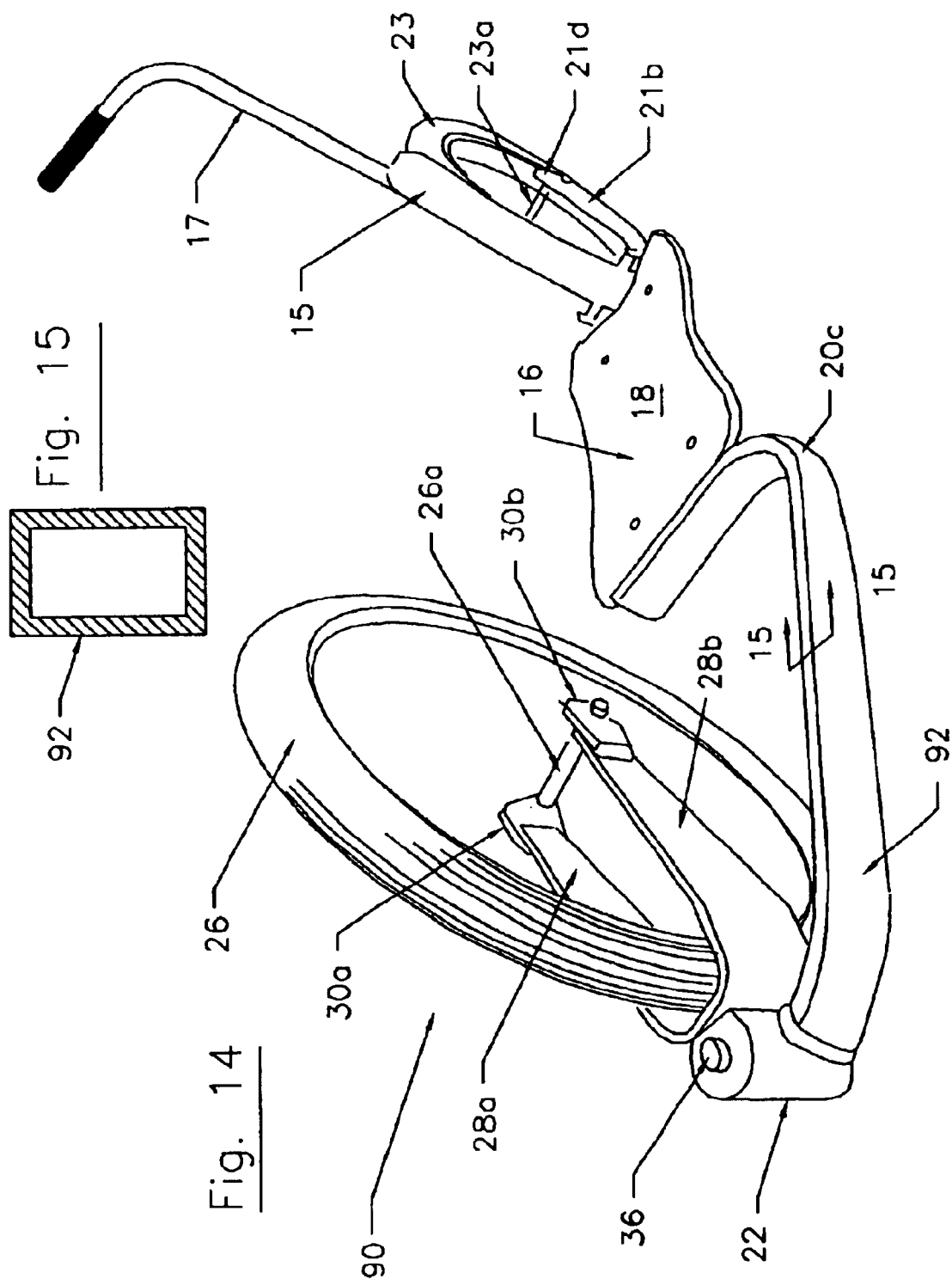

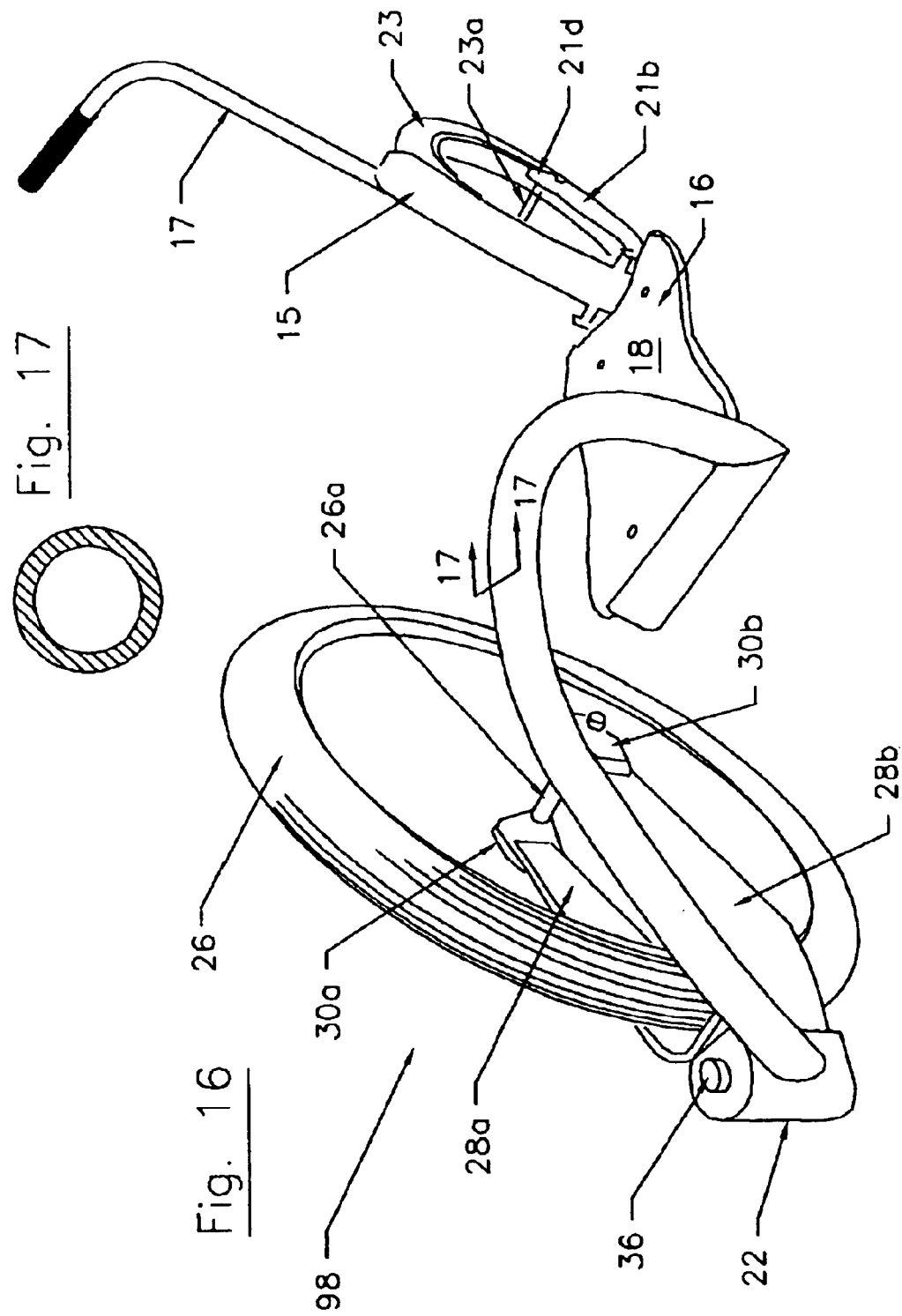

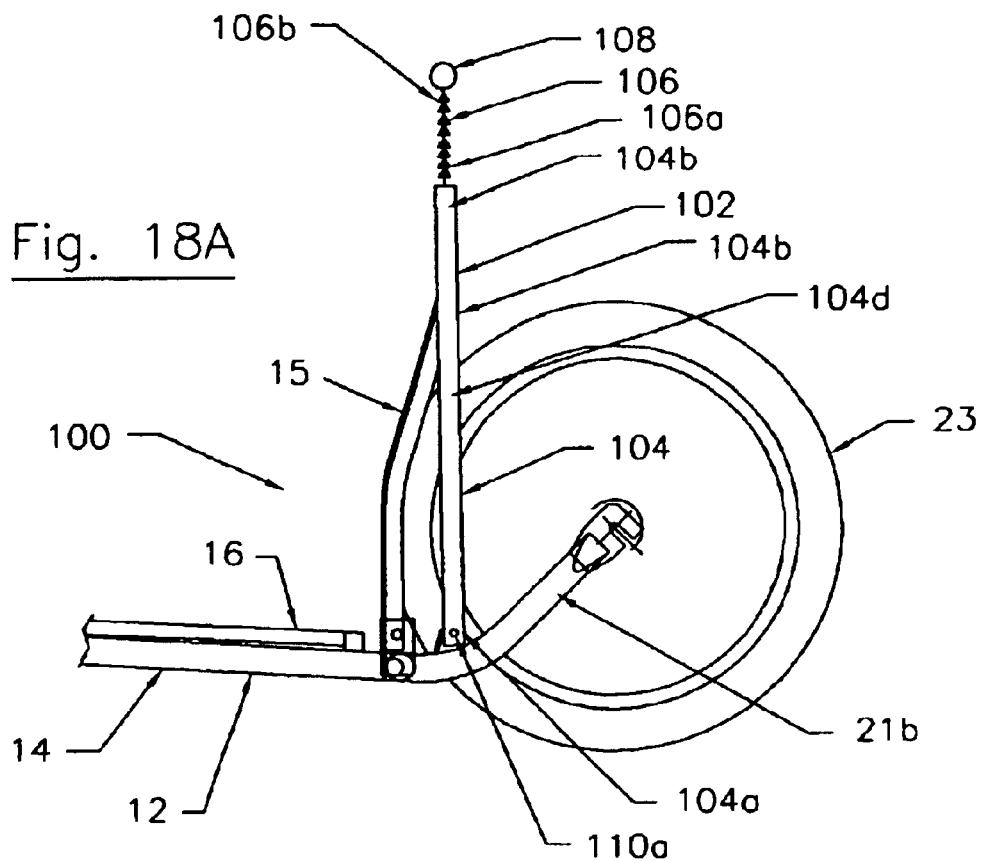
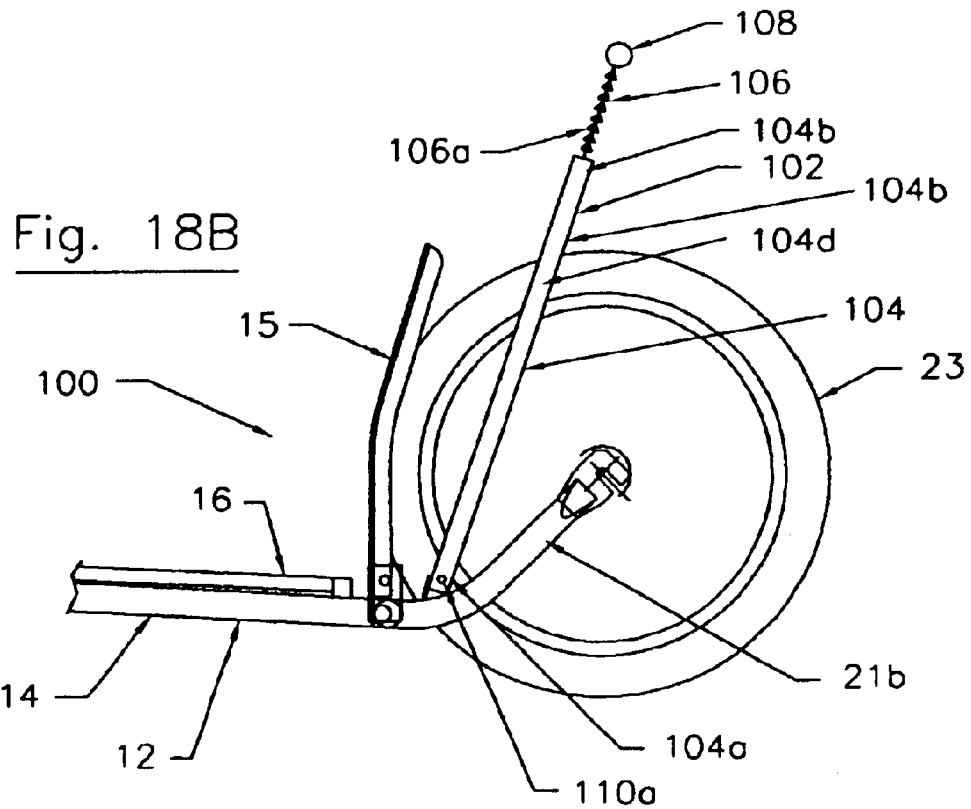

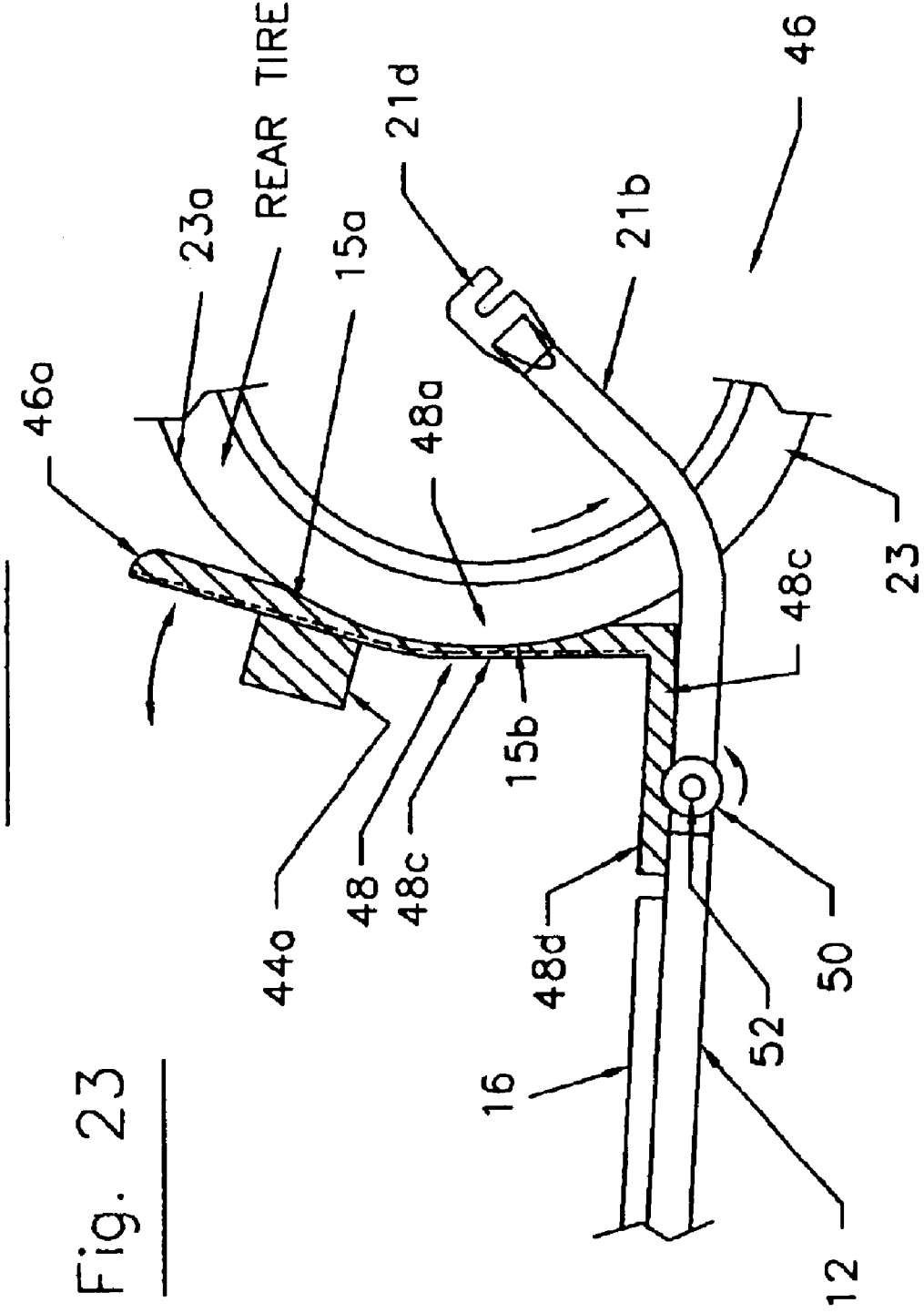

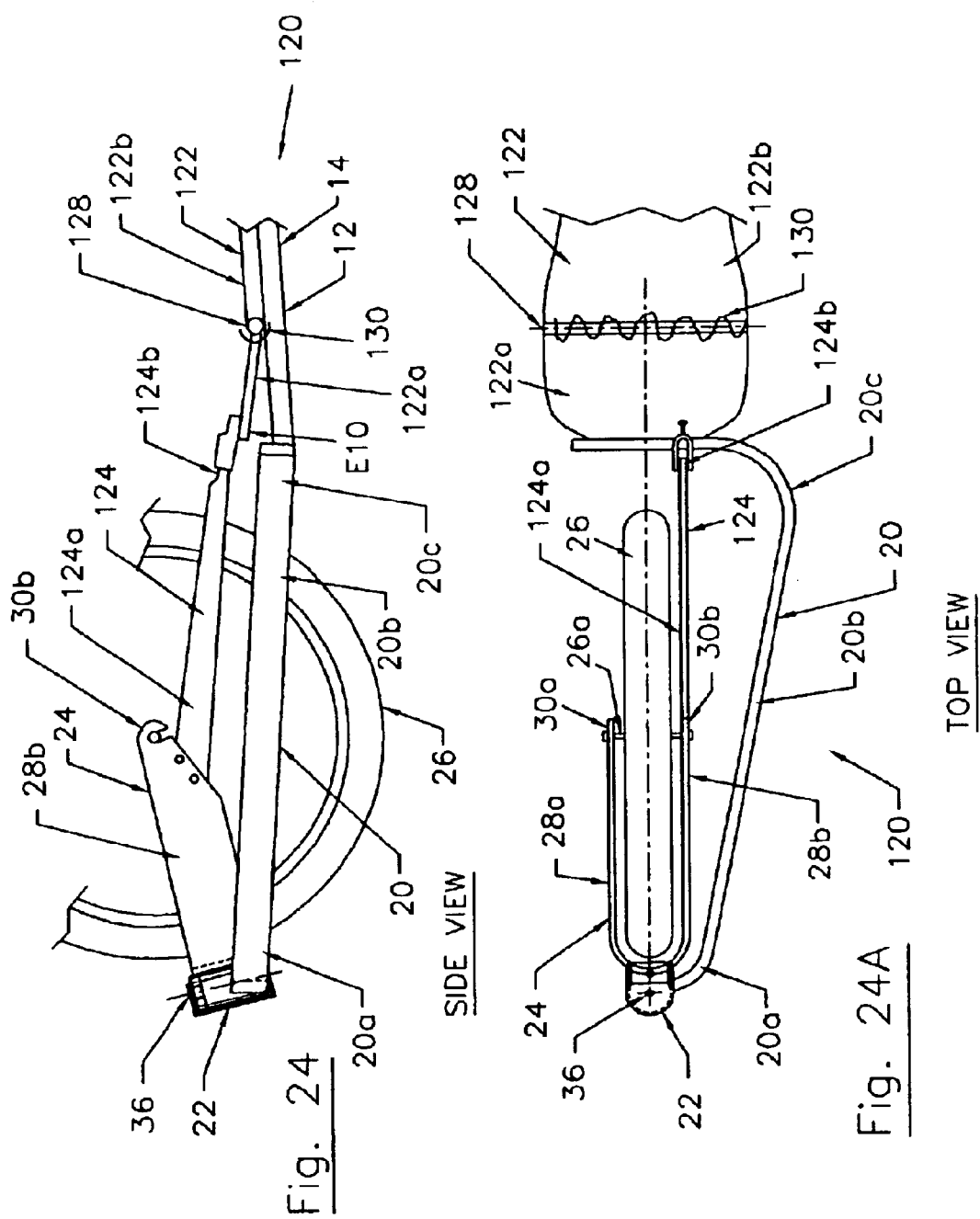

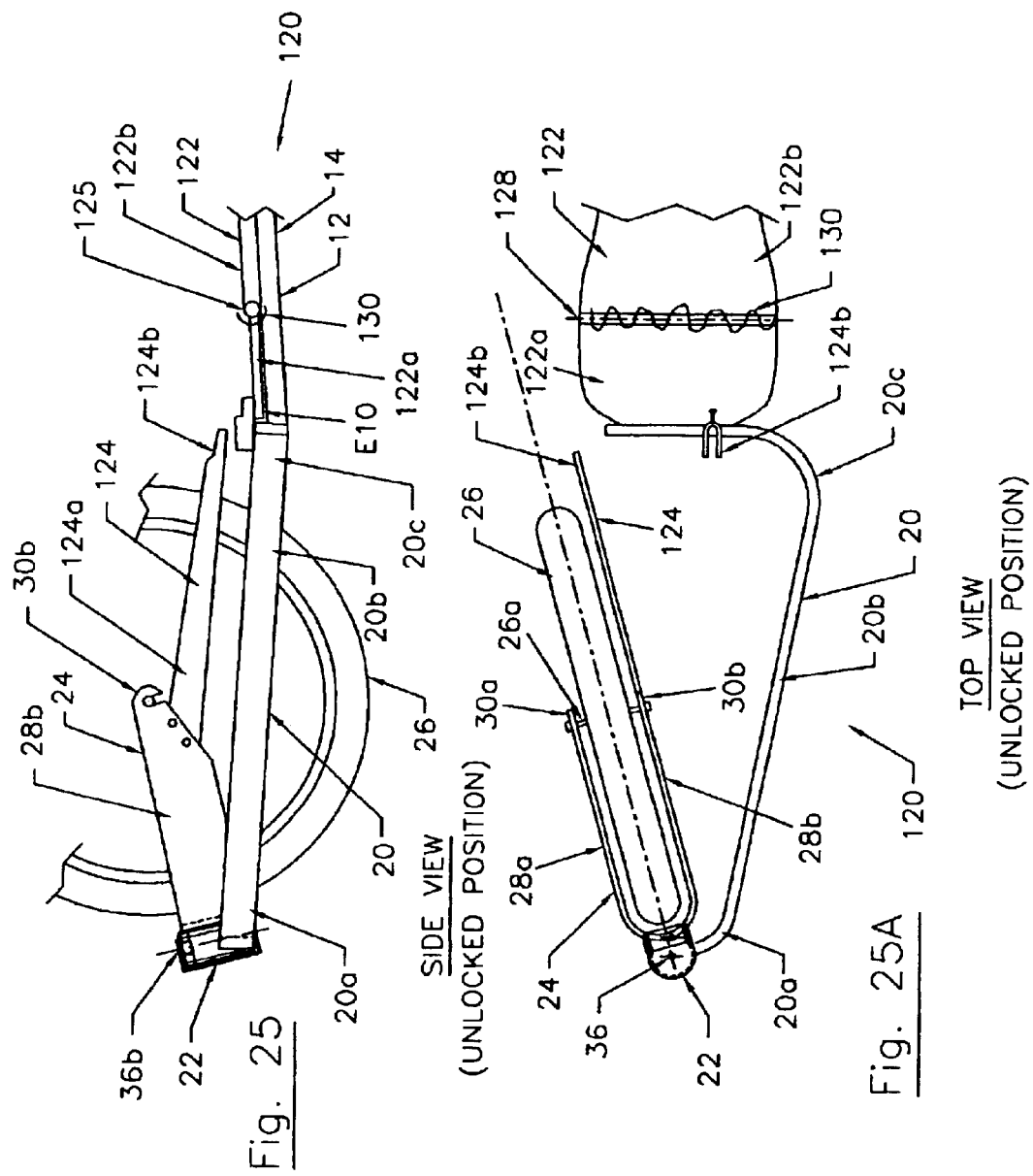

WHEEL BOARD VEHICLE

RELATED PATENT APPLICATIONS & INCORPORATION BY REFERENCE

This application is a utility application based on U.S. provisional patent application Ser. No. 60/334,366, entitled "Wheel Board Vehicle," filed Nov. 30, 2001. This provisional related application is incorporated herein by reference and made a part of this application. If any conflict arises between the disclosure of the invention in this utility application and that in the related provisional application, the disclosure in this utility application shall govern. Moreover, the inventor incorporates herein by reference any and all U.S. patents, U.S. patent applications, and other documents cited or referred to in this application or cited or referred to in the U.S. patents and U.S. patent applications incorporated herein by reference.

DEFINITIONS

The words "comprising," "having," and "including," and other forms thereof, are intended to be equivalent in meaning and be open ended in that an item or items following any one of these words is not meant to be an exhaustive listing of such item or items, or meant to be limited to only the listed item or items.

BACKGROUND OF THE INVENTION

Riding wheel board vehicles is becoming popular as a recreational pastime and sport. One type of wheel board vehicle is illustrated in U.S. Pat. No. 6,398,237 B1, and an embodiment of the wheel board vehicle discussed in this patent is believed to be sold by Design Science Pty. Ltd. of South Fremantle, Australia under the trademark Dirtsurfer. This wheel board vehicle includes a rigid frame having front and rear wheels mounted to the frame, a support structure between the wheels that is attached to the frame, and a manually actuated brake. The front wheel is between a pair of support arms extending from the front end of the frame and is mounted to pivot and turn. The rear wheel is mounted between a pair of support arms extending from the rear end of the frame to only rotate and not pivot. The axles of the front and rear wheels are along the central longitudinal axis of the frame, and the wheels are exactly in-line when the vehicle is traveling in a straight line.

The rider stands on the support structure while riding the vehicle. The rider first places one foot on the support structure and, with the other foot, pushes on the ground to start the vehicle moving. Starting is one of the more problematic aspects of using a wheel board vehicle, because the vehicle instead of moving in a straight line may turn due to the front wheel pivoting either clockwise or counterclockwise. Once the vehicle is moving, the rider places both feet on the support structure with his or her body facing generally towards either the starboard side or port side of the vehicle and the rider's head turned to look forward towards the front wheel. To turn the vehicle, the rider moves his or her body to change the center of gravity of the vehicle/rider mass. For example, leaning to the right causes the vehicle to turn to the right, and leaning to the left causes the vehicle to turn to the left.

The front pair of support arms has a front yoke between the arms mounted to pivot. These front support arms, however, limit the maximum turning angle of the front yoke and the front wheel to 10° or less. Consequently, the vehicle cannot make sharp turns. Any increase in turning angle, even a few degrees, would greatly improve the maneuverability of the vehicle. The front pair of support arms also acts like rigid beams and flexes very little, if at all, when the front wheel strikes a bump, branch, rock, or other obstacle. The shock of riding over an obstacle can cause the rider to lose his or her balance and fall off the vehicle.

The manually actuated brake employs a conventional brake pad assembly used in many bicycles to stop the vehicle. The brake pad assembly includes a pair of pads positioned on opposite sides of the rim of the rear wheel. A lever mounted to the frame to pivot when the rider bears against it with his or her calf pulls on a cable attached to the pads to move them towards each other and engage the rim. A spring return separates the pads when the rider disengages by ceasing to apply pressure to the lever with his or her calf.

SUMMARY OF INVENTION

This invention, with its several desirable features, is summarized in the CLAIMS that follow. After reading the following section entitled "DETAILED DESCRIPTION OF SOME EMBODIMENTS OF THIS INVENTION," one will understand how the features of this invention provide its benefits. The benefits of this invention include, but are not limited to: (i) shock absorption, (ii) an aid to make it easier to start riding the vehicle, (iii) a greater turning angle of the front wheel for sharper turns, and (iv) a more convenient to use, easy to store, and a less costly and easier to assemble, brake. Without limiting the scope of this invention as expressed by the claims that follow, some, but not all, of its features are:

One, it may include an intermediate portion including a board on which a rider stands while riding the vehicle, and a frame having a front end and a rear end carrying a rear wheel. A front wheel is mounted to a support arm on the front end to pivot. The board may have a substantially planar top surface, and the frame has a central longitudinal axis, and the support arm is in a reference plane that cuts through the longitudinal axis lengthwise and that is substantially at a right angle to the planar surface of the board. In one embodiment, the support arm is in a plane that is at an angle between about 15 and about 75 degrees with respect to the reference plane. The frame may be collapsible. In such instance, typically the intermediate portion of the frame includes a hinge member. This hinge member enables the frame to have (i) a collapsed position where the front and rear wheels are adjacent to each other and the board is to one side of the adjacent wheels and (ii) an extended position where the front and rear wheels are displaced from each other and the board is between these wheels. In one embodiment, the wheels have a diameter of from about 8 to about 26 inches, and in one embodiment the wheels are tires having a width of from about ½ to about 10 inches.

Two, only a single support arm having an outboard end extends from the front end. A front yoke may be attached by a pivot member to the outboard end for lateral rotation. This pivot member may be above, or partially above and partially below, or entirely below, an axle of the front wheel. This front yoke carries the front wheel that is turned as the front yoke is rotated by a rider while standing on the board moving his or her body to change the center of gravity of the vehicle/rider mass. A front wheel axle may be mounted to the front yoke and a rear wheel axle may be mounted between a pair of stationary support members. The front yoke may comprise a pair of elements that each have first and second ends. The first ends may be connected to a pivot member at the outboard end of the support arm, and the second ends may point inward in substantially the same direction as the longitudinal axis when the wheels are in line.

Three, the support arm may be tubular and serve as a torsion bar. In one embodiment, the support arm is to one side of the front wheel and positioned to enable the yoke to rotate through a turning angle of at least about 13 degrees in both clockwise and counter-clockwise directions. In one embodiment, the support arm is positioned above the front wheel to enable the yoke to rotate through a turning angle of at least about 20 degrees, for example, from about 20 to about 45 degrees, in both clockwise and counter-clockwise directions. Stops members may be positioned so that the maximum turning angle of the yoke is the same in both clockwise and counter-clockwise directions. In one embodiment, the support arm comprises a pair tubular members positioned side by side in parallel and partially surrounding the front wheel to provide an open lower side that allows a portion of the front wheel to project through this lower side.

Four, in one embodiment, the board may have a generally rectangular configuration having a first pair of opposed sides that are longer than a second pair of opposed sides. The first pair of opposed sides each may have generally concave edges. One of the second pair of opposed sides may have a front edge and the other of the second pair of opposed sides may have a rear edge that is generally concave. Each side of the first pair of opposed sides may have a rear portion that tapers inward and terminates at the rear edge. The board has a front end that may have a maximum width, a rear end with a maximum width, and a central section with a maximum width, the maximum width of the central section being less than each one of the maximum widths of the front and rear ends. A typical board, for example, has a length of from about 15 to about 36 inches and a width of from about 6 to about 12 inches, and is from about 3 to about 8 inches above ground in a generally horizontal orientation while a rider is standing on the board riding the vehicle.

Five, the vehicle of this invention may include a brake member attached to the frame near the rear wheel in a position to be manually actuated by a rider riding the vehicle to bear against a portion of an outer surface of the rear wheel that contacts the ground as the rear wheel rotates to apply a braking force to the rear wheel. The brake member may include an arm element having a first end attached by a pivot member to the frame and a free end that moves into engagement with the outer surface of the rear wheel upon the rider manually actuating the brake member. Typically, a spring member normally moves the arm element into a position where the free end is disengaged from the outer surface of the rear wheel. In one embodiment, the arm element may have a pad at the free end on a side of the arm element that faces away from the rear wheel. The arm element is sufficiently long so that the pad engages a calf of a leg of the rider while the rider is riding the vehicle and the rider manually actuating the brake member by pressing his or her calf against the pad. Usually, the pad is made of a resilient material that enables the rider to apply the braking force in a controlled manner, increasing or decreasing this force progressively. The pad may have a concave surface facing the calf of the rider while the rider is riding the vehicle.

Six, the vehicle of this invention may include a handle attached to the frame in a generally upright orientation while a rider rides the vehicle. The handle may be near the front wheel or the rear wheel, and it may be detachably mounted to the frame. The handle may be rigid and immovable while a rider rides the vehicle, but it may be detachable and its height and orientation may be adjustable. In one embodiment, the handle (a) is mounted to the frame for adjustment by (i) lowering or raising the handle relative to the surface of the board and (ii) rotating the handle clockwise or counter-clockwise, and (b) after adjustment, is secured in a fixed position.

These features are not listed in any rank order nor is this list intended to be exhaustive.

DESCRIPTION OF DRAWINGS

Some embodiments of this invention, illustrating all its features, will now be discussed in detail. These embodiments depict the novel and non-obvious wheel board vehicle of this invention as shown in the accompanying drawings, which are for illustrative purposes only. These drawings includes the following figures (Figs.), with like numerals indicating like parts:

FIG. 2 is a plan view of the wheel board vehicle shown in FIG. 1.

FIG. 3 is a side elevational view taken along line 3—3 of FIG. 2.

FIG. 4 is a fragmentary, side elevational view of the vehicle shown in FIG. 1, illustrating a handle extending from the vehicle's frame in a generally upright orientation when the vehicle is being ridden.

FIG. 12 is a plan view of the fourth embodiment of the vehicle of this invention similar to that shown in FIG. 11 but employing wide tires.

FIG. 13 is a side elevational view taken along line 13—13 of FIG. 12.

FIG. 14 is a perspective view of a fifth embodiment of the vehicle of this invention, which is similar to the first embodiment but employing a single support arm of tubular construction.

FIG. 15 is a cross-sectional view taken along line 15—15 of FIG. 14.

FIG. 16 is a perspective view of the sixth embodiment of the vehicle of this invention showing a single, tubular support arm oriented at an angle to a central reference plane.

FIG. 17 is a cross-sectional view taken along line 17—17 of FIG. 16.

FIG. 18A is a fragmentary, side view showing the tension-type handle in use.

FIG. 18B is a fragmentary, side view similar to FIG. 18A showing the tension-type handle in a stowed position.

FIG. 21A is a plan view taken along line 21A—21A of FIG. 21.

FIG. 23 is a partial cross-sectional view of the brake shown in FIG. 22.

FIG. 24 is a fragmentary side view of a guide mechanism for the wheel board vehicle of this invention, showing the guide mechanism engaged to steer the vehicle in a straight line by preventing the front wheel from turning.

FIG. 24A is a fragmentary plan view of the guide mechanism depicted in FIG. 24.

FIG. 25 is a fragmentary side view similar to that shown in FIG. 24 showing the guide mechanism disengaged to enable the front wheel to turn to the right or the left.

FIG. 25A is a plan view plan view of the guide mechanism depicted in FIG. 25.

DETAILED DESCRIPTION OF SOME EMBODIMENTS OF THIS INVENTION

A First Embodiment

Figure 1:
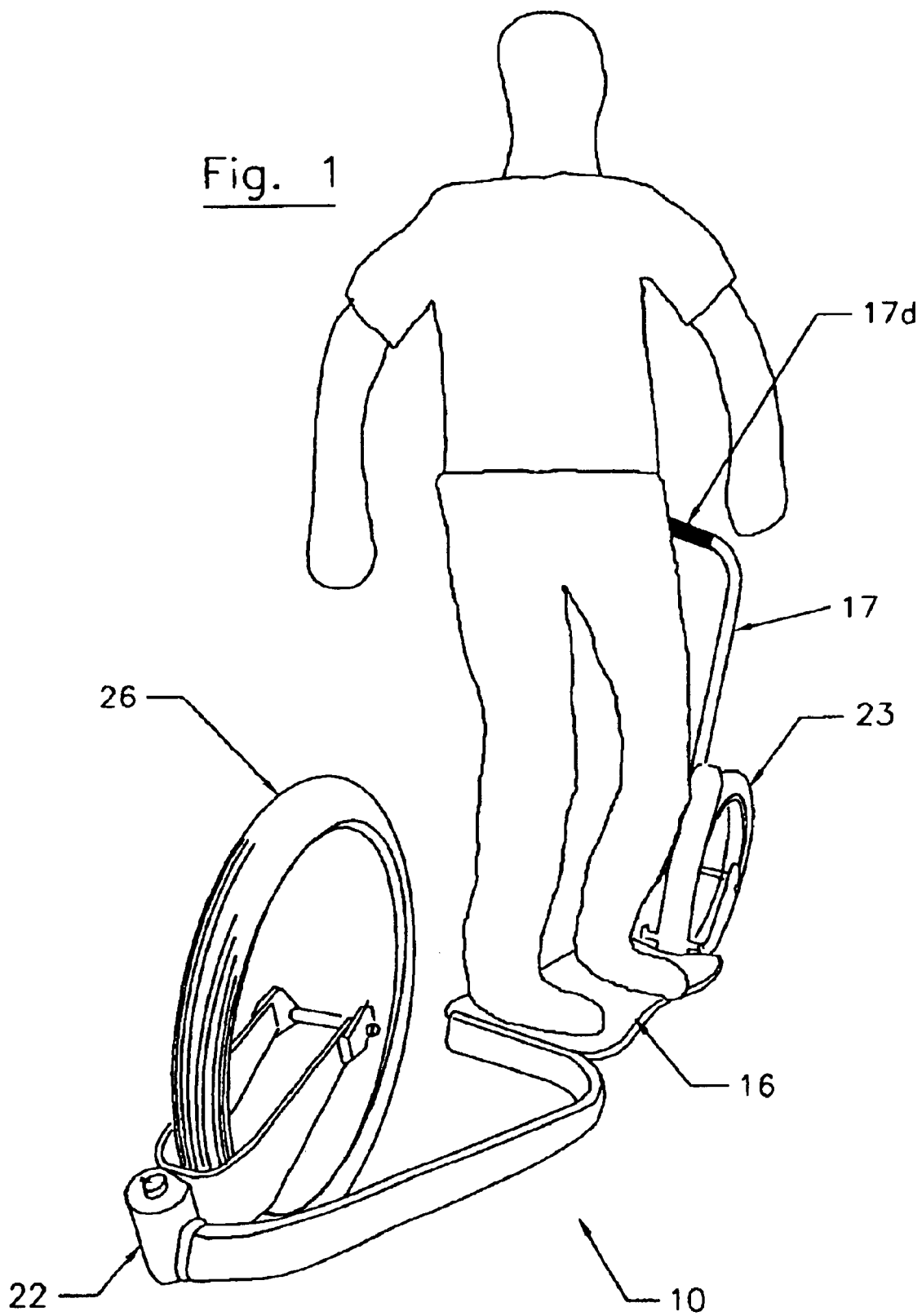
FIG. 1 is a perspective view of the first embodiment of the wheel board vehicle of this invention showing a rider on the vehicle.

As illustrated in FIGS. 1–9, a first embodiment of this invention, the wheel board vehicle 10, includes a rigid frame 12 supporting a front spoke wheel 26, a spoke rear wheel 23, a board 16 between these wheels, and a brake 15. The width of the tires of these front and rear wheel ranges from about 1 to about 10 inches. The frame 12 comprises substantially parallel tubes 13a and 13b spaced apart from approximately 3 to 6 inches. Rearward beyond the brake 15, the tubes 13a and 13b taper inward forming a pair of substantially parallel rear support arms 21a and 21b integral with the frame 12 and spaced apart. The rear wheel 23 has its axle 23a extending between the outboard ends 21c and 21d, respectively, of the rear support arms 21a and 21b. This rear wheel 23 does not turn or pivot. It only rotates while the vehicle 10 is moving.

The frame 12 has a front end 12a from which extends a single, rigid support arm 20 having an outboard end 20a to which a pivot member 22 is fixedly attached. This rigid support arm 20 is a solid piece. Or, as discussed in greater detail subsequently in connection with the other embodiments of this invention, preferably is of tubular construction in order to provide a torsion bar that absorbs much of the energy produced by the vehicle 10 hitting an obstacle.

The single support arm 20 has straight central portion 20b that slants outward from the front wheel's axle 26a away from the front wheel 26 a sufficient distance to enable the front wheel to have a turning angle in excess of 10°. In accordance with one feature of the vehicle 10, the front wheel 26 has a turning angle of at least 13° in either direction. The rigid support arm 20 extends outwardly at an angle of approximately 13 degrees with respect to the longitudinal axis X (FIG. 2A) of the frame 12. The straight portion 20a of this arm is approximately equal to, or slightly greater than, the diameter of the front wheel 26. A rear portion 20c of the arm 20 is from approximately 4 to 8 inches displaced from the longitudinal axis X of the frame 12. This rear portion 20c curves around to form a connection section 20d that is fixedly attached to the tubes 13a and 13b at the front end 12a of the frame 12. The support arm 20 lies in a plane that is substantially at a right angle to a reference plane R that cuts through the longitudinal axis X lengthwise and that is substantially at a right angle to the planar surface 18 of the board 16.

Figure 2A:
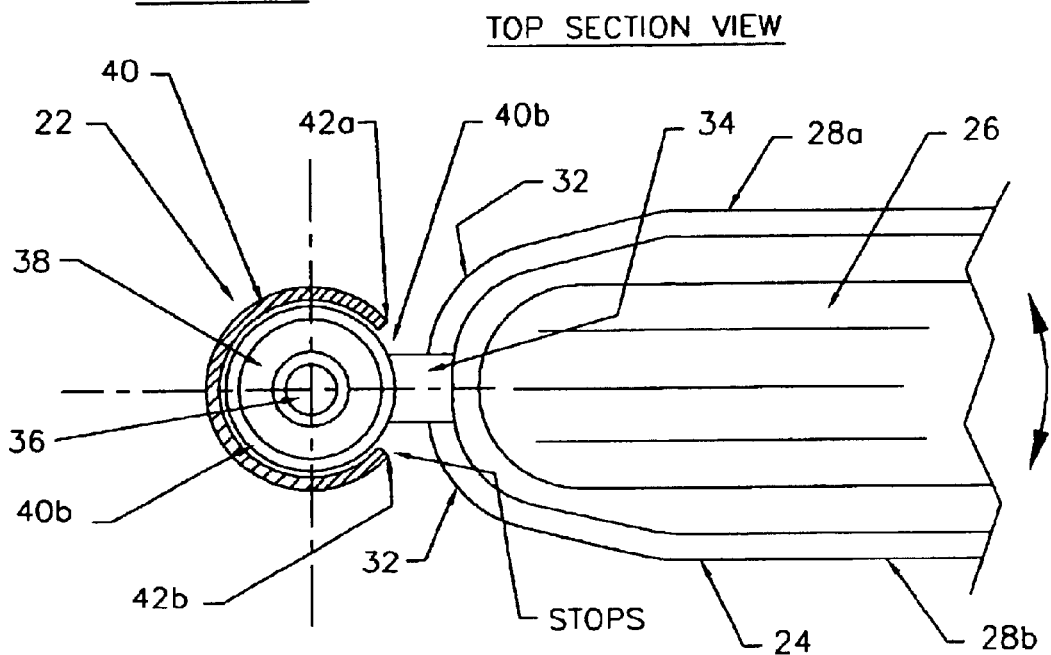
FIG. 2A is a fragmentary plan view, partially in cross-section, of the pivot member-front yoke assembly for the wheel board vehicle shown in FIG. 1 positioned so that the vehicle moves in a straight line.
Figure 2B:
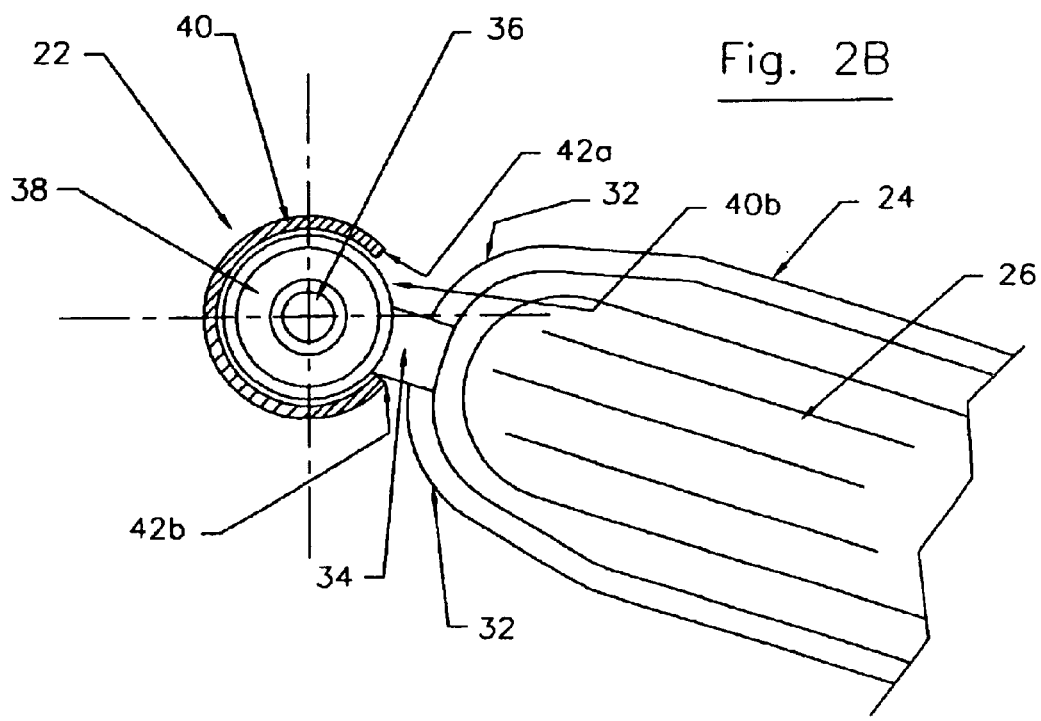
FIG. 2B is a plan view similar to that of FIG. 2A, depicting the pivot member-front yoke assembly, with the yoke turned to its maximum in the clockwise direction so that the vehicle turns to the right.
Figure 5:
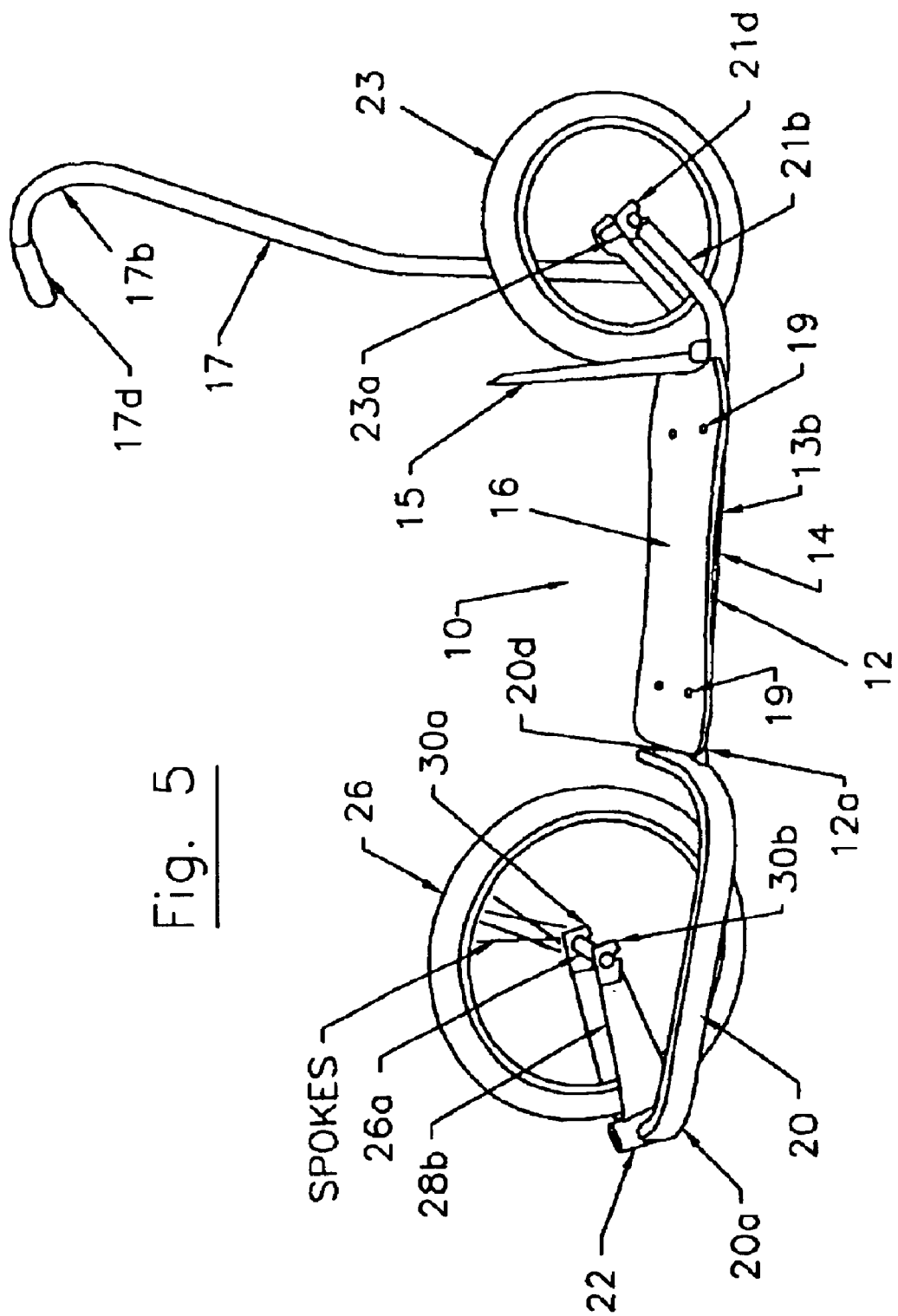
FIG. 5 is a perspective view of the vehicle shown in FIG. 1 in an upright, generally vertical orientation.
Figure 6:
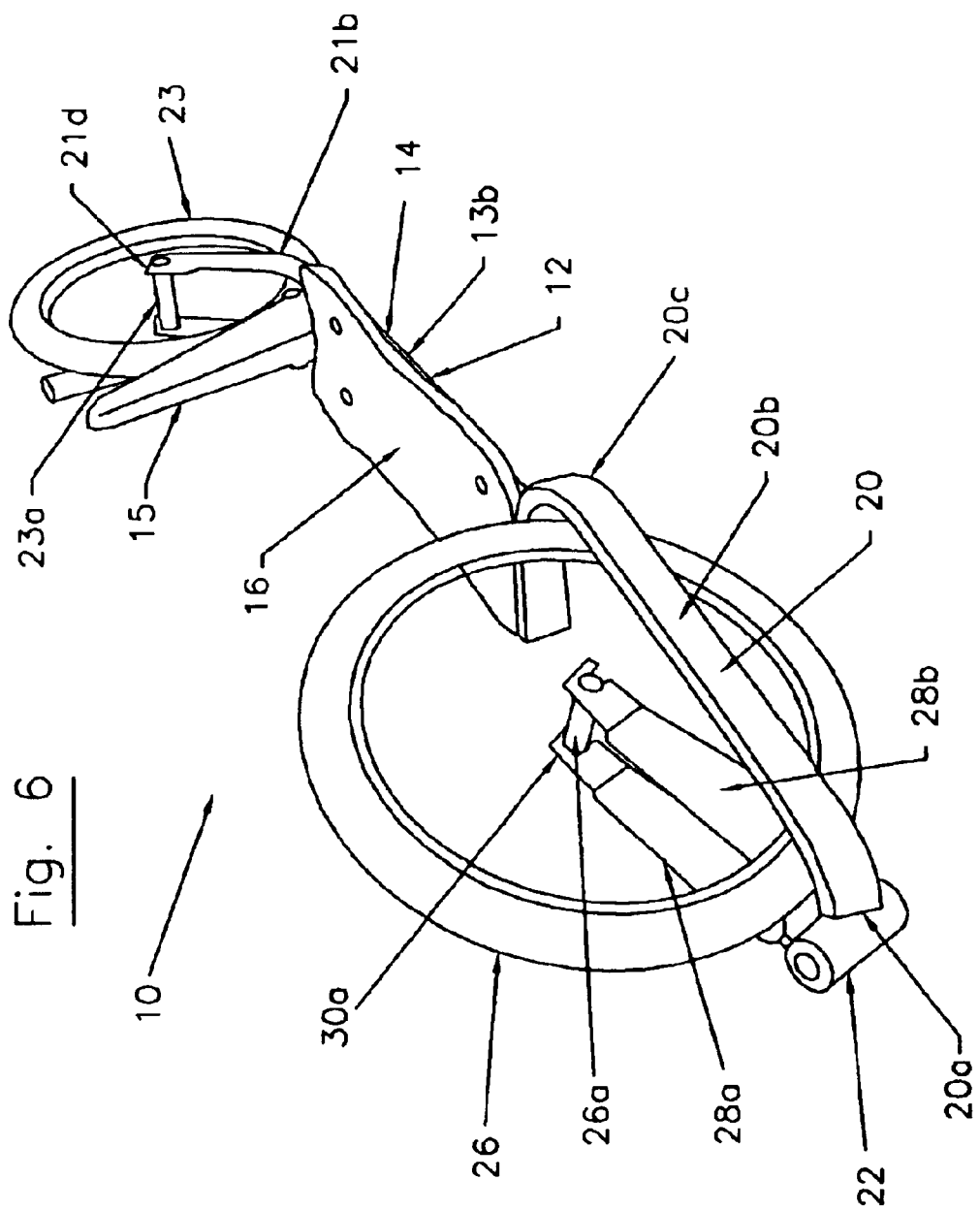
FIG. 6 is a perspective view of the vehicle shown in FIG. 1, with the handle detached, showing the vehicle resting on one edge of the board that supports the rider while riding the vehicle.
Figure 7:
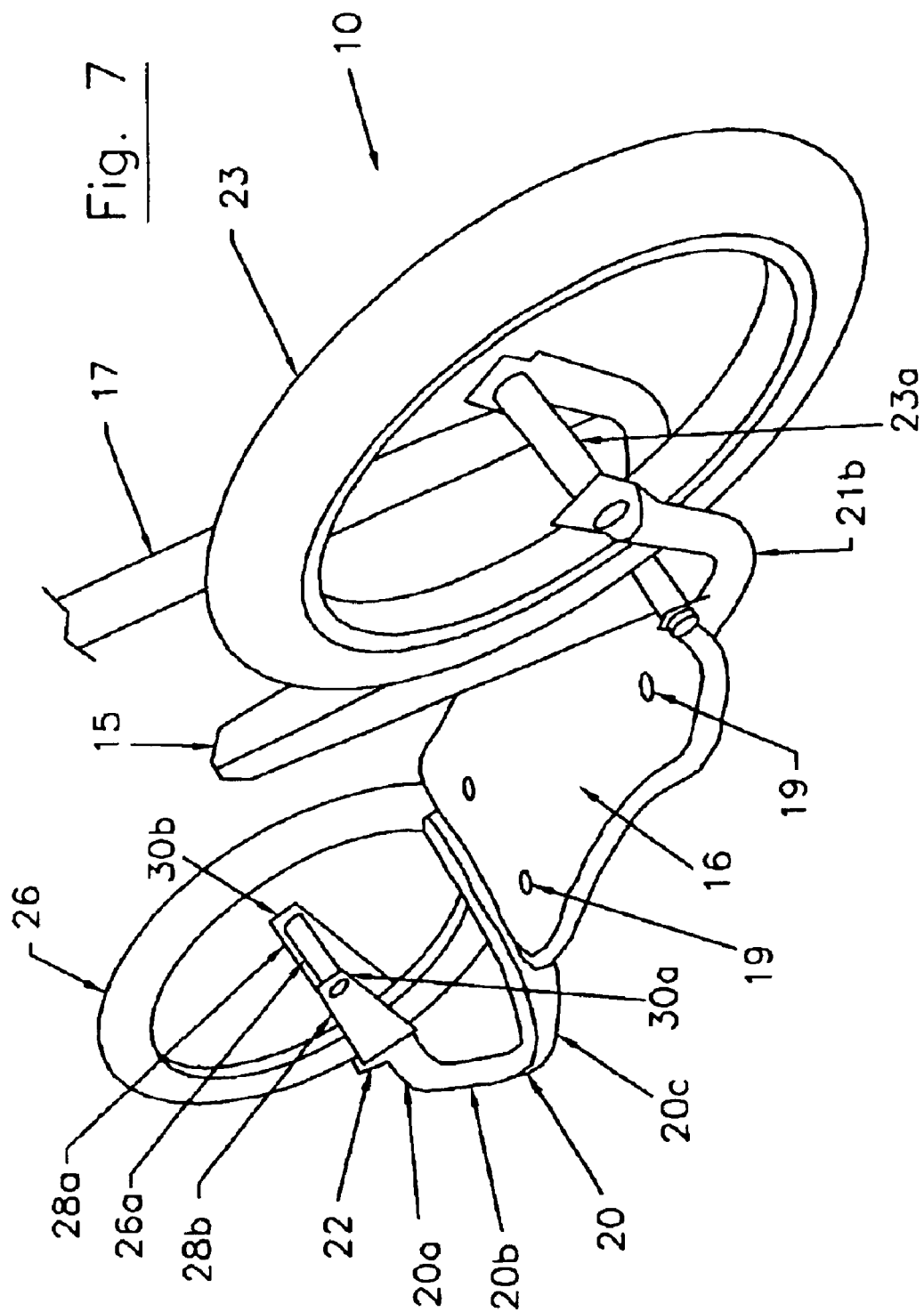
FIG. 7 is a perspective view showing the vehicle of FIG. 1 lying on its opposite side from that shown in FIG. 6, with the vehicle's single support arm serving as a rest for the vehicle.
Figure 8:
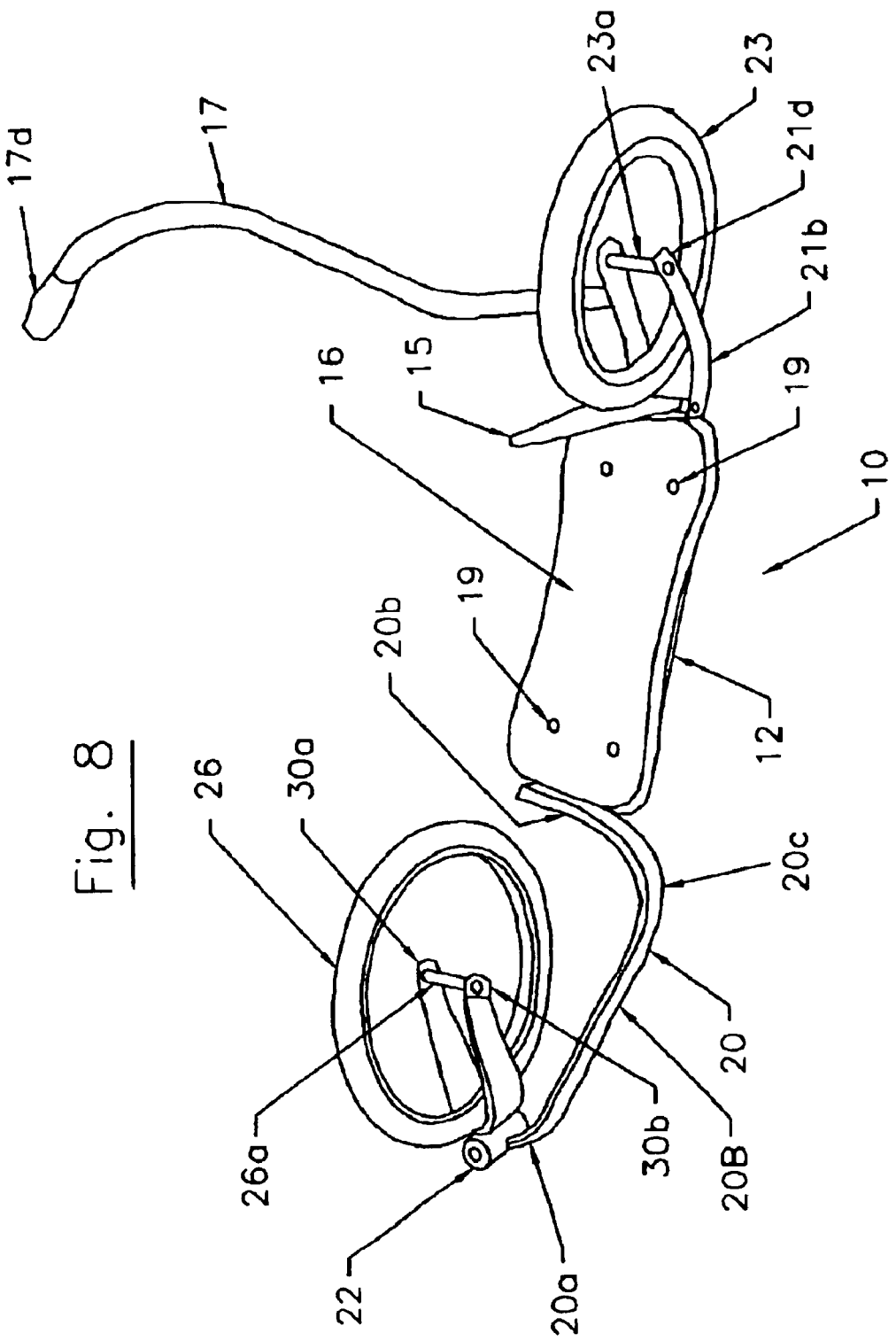
FIG. 8 is a perspective view of the vehicle shown in FIG. 1, with the front yoke turned slightly and the vehicle resting on its single support arm.
Figure 9:
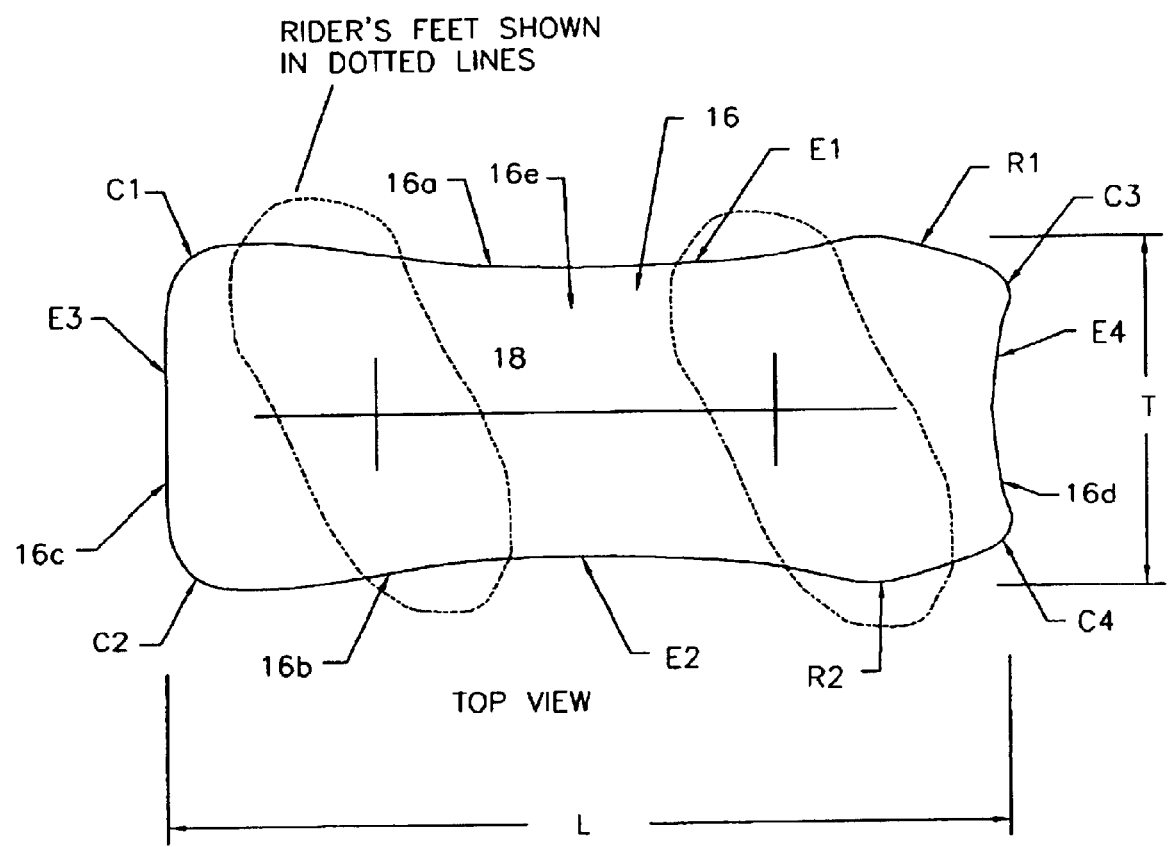
FIG. 9 is a plan view of the board on which the rider stands while riding the vehicle.

The pivot member 22 is coupled to a front yoke 24 and it is constructed in a manner that enables the front yoke to move laterally either clockwise or counter-clockwise as viewed in FIGS. 2A and 2B. The front yoke 24 carries the front wheel 26 by the front wheel's axle 26a. The components of the pivot member 22 and front yoke 24 interact as follows, enabling the front wheel 26 to turn an equal number of degrees in either direction:

The yoke 24 includes a pair of arms 28a and 28b that straddle the front wheel 26. The axle 26a extends between the opposed free ends 30a and 30b, respectively, of these arms 28a and 28b. As shown in FIGS. 2A and 2B, the inner ends 32 of these arms 28a and 28b merge so that the yoke 24 has a generally V-shape configuration. A bracket 34 projects outward from the merged ends 32. There is pivot member 36 having an outer, cylindrical pivot shell 40 fixedly attached to the outboard end 20a of the single support arm 20. Seated within the pivot shell 40 to rotate is a pivot element 38 that is fixedly attached to the bracket 34. This pivot shell 40 has a cut-away section 40b that provides opposed sides 42a and 42b that serve as stops. The stops or sides 42a and 42b are each the same distance from the longitudinal axis X of the frame 12. The projected axis Z (FIG. 3) of the pivot pin 36 intersects with ground at the point O a substantially distance in advance of the contact point P of the front wheel 26. This gives the vehicle 10 stability as it moves.

In FIG. 2A the front wheel 26 is shown in-line with the rear wheel 23 so that both wheels are within the reference plane R. In FIG. 2B the front wheel 26 has been turned in a clockwise direction as viewed in this FIG. 2B to its maximum degree of turning angle. In this position the bracket 24 engages the side 42b. The front wheel 26 is now displaced from the axis X at least 13° to turn the vehicle 10 sharply to the right. The front wheel 26 may also be turned in a counter-clockwise direction as viewed in this FIG. 2B to a maximum turning angle of at least 13° when the bracket 24 engages the side 42a. In this instance, the front wheel 26 would turn the vehicle 10 to the left.

The board 16 is fixedly attached by bolts 19 (FIGS. 5–8) to an intermediate portion 14 of the frame 12. Its planar surface 18 is substantially flat to assist a rider (FIG. 1) to stand thereon while riding the vehicle 10. The typical normal position of a rider's feet (right-handed rider) while standing on the board 16 is shown in dotted lines in FIG. 9. As illustrated best in FIG. 9, the board 16 has a generally rectangular configuration with its long opposed sides 16a (starboard side) and 16b (port side) each having generally concave edges E1 and E2, respectively. The short opposed sides, the front side 16c adjacent the front wheel 26 and the rear side 16d adjacent the rear wheel 23, are shaped differently. The front side 16c has a straight front edge E3 with rounded corners C1 and C2 and the rear side 16d has a rear edge E4 that is generally concave. Each long side 16a and 16b has a rear portion R1 and R2 that tapers inwardly and terminates in rounded corners C3 and C4 at the rear edge E4.

The front side 16c has a maximum width of from about 6 to about 12 inches, the rear side 16 with a maximum width from about 6 to about 12 inches, and a central section 16e with a maximum width W. The maximum width W of the central section 16e is less than each one of said maximum widths of the front side 16c and rear side 16d. This maximum width W is typically from about 5 to about 10 inches. The board 16 has a length L of from about 15 to 36 about inches and a nominal width T from about 6 to about 12 inches. It is a distance D from about 3 to about 8 inches above ground when standing upright as shown in FIG. 3. The board's planar surface is generally horizontally orientated, but may be at a slight angle with respect to ground (FIG. 3), while the rider is standing on the board 16 riding the vehicle 10.

As shown in FIG. 4, rearward of the brake 15 is a rigid handle 17 that is in an immovable position and is rigid, allowing the rider at start-up to push against it to counteract any tipping moment. But preferably it is detachably mounted. Also, prior to being fixed in its immovable position, the handle 17 may be rotated or raised or lowered within its telescopic mount 17a that is fixedly attached to the frame 12. The handle's curved upper end 17b is rotated into a position to accommodate either a right-handed or left-handed rider. The handle 17 is also adjusted to accommodate the height of the rider by moving it up or down. After properly positioning it for the individual rider, a screw clamp 17c (FIG. 4) is manually tightened to hold the handle 17 in an immovable position. This handle 17 may have a grip 17d (FIGS. 5 and 8) at its is curved upper end 17b, and it is generally oriented in an upright orientation when a rider is riding the vehicle 10. Typically, it is at an angle of from approximately 5 to 15 degrees of inclination away from the rider. This handle 17 is used by the rider to create a restoring moment that resists a tipping moment that frequently initially occurs at start-up. If the vehicle 10 starts to tip, the rider pushes against the handle in a direction opposite the direction that the vehicle is tipping towards. For, example, if the rider feels the vehicle 10 tipping towards the starboard side, he or he pulls the handle towards the port side.

Figure 21:
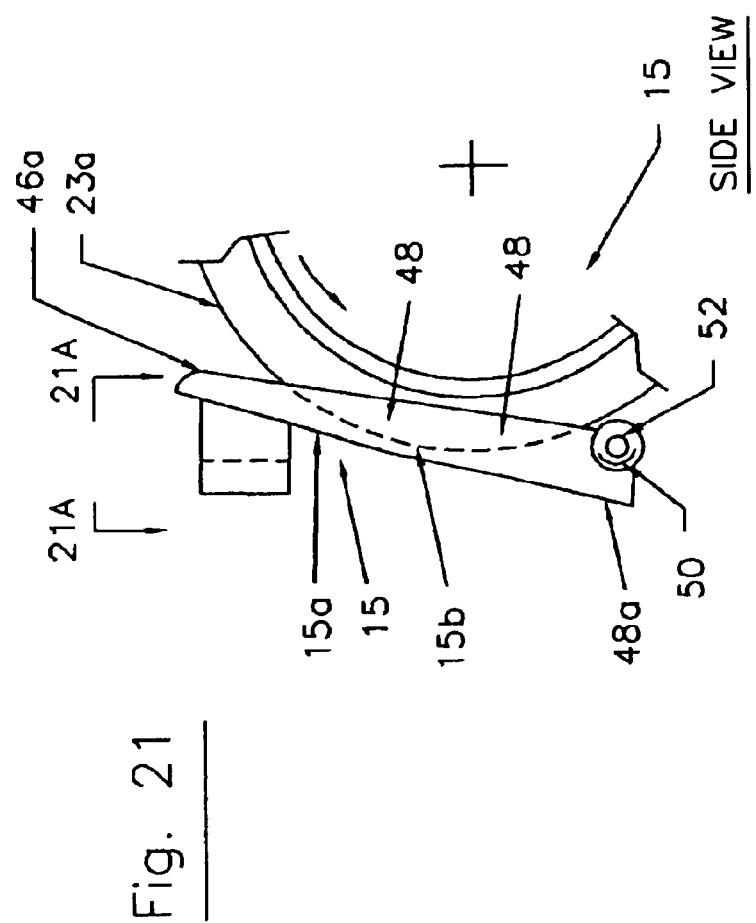
FIG. 21 is a fragmentary side view of the first embodiment of the brake used in the wheel board vehicle of this invention.
Figure 22:
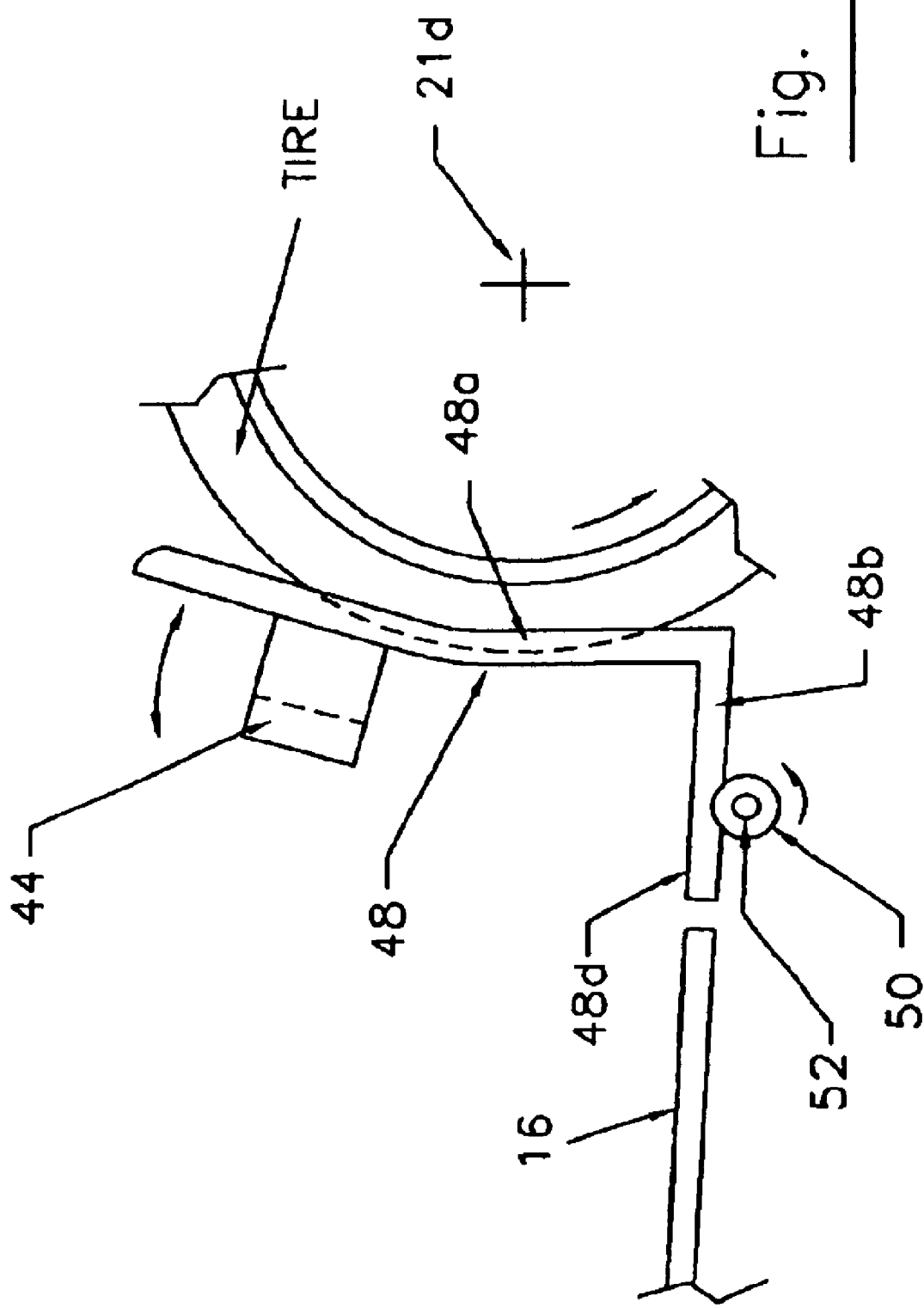
FIG. 22 is a fragmentary side view of a second embodiment of the brake used in the wheel board vehicle of this invention.

There are two different embodiments of a brake used in this invention, the brake 15 best shown in FIGS. 21 and 21A and the brake best shown in FIGS. 22 and 23. The brakes 15 and 46 are each attached to the frame 12 between the rear side 16d of the board 16 and the rear wheel 23. Both embodiments include a brake arm, namely arms 48 and 48', respectively. Each brake arm 48 and 48' has a pad 44 attached at a free end 46a to an outer side 15a of these arms.

The pad 44 is resilient, for example being made of foam rubber, enabling the rider to apply progressively more or less braking force. The arms 48 and 48' are each sufficiently long so that the pad 44 engages an upper calf of the leg of the rider while the rider is riding the vehicle. Preferably the pad 44 has a concave surface 44a facing the calf of the rider while the rider is riding the vehicle.

Each brake arm 48 and 48' has a concave inner side 15b and a torsion spring 50 wrapped around a pivot element 52 attaching the individual arms to the frame 12. In the brake 15, the brake arm 48 is substantially straight and the pivot element 52 is at the lower end 48a of this arm opposite the free end 46a. In the brake 46, the brake arm 48' is L-shaped, having legs 48b and 48c intersecting substantially at a right angle. The pivot element 52 is at or near the outer end 48d of the leg 48b and 48c. The rider while standing on the board 16 riding the vehicle 10 manually actuates the brake 15 or 46, as the case may be, by applying pressure to the brake.

The rider actuates the brake 15 by bearing against the brake arm 48 with the calf of his or her leg. When the rider pushes against the brake arm 48 with the calf of his or her leg, the brake arm 48 pivots about the pivot element 52, rotating clockwise as viewed in FIGS. 21 and 21A. This brings an intermediate section of the concave inner side 15b to bear against a portion of the outer surface 23a of the rear wheel 23.

The rider actuates the brake 46 using one leg and his or her feet of this one leg to bring an intermediate section of the concave inner side 15b of the brake arm 48' into contact with a portion of the rear wheel 23. The rider places calf of the one leg against the pad 44 and the heel of the foot snug against the intersection of the legs 48b and 48c and then pushes the heel downward against the exterior surface of the leg 48c. This causes the brake arm 48' to pivot about the pivot element 52, rotating clockwise as viewed in FIGS. 22 and 23 to bring an intermediate section of the concave inner side 15b of the brake arm 48' to bear against a portion of the outer surface 23a of the rear wheel 23. Contact of the intermediate sections of the inner sides 15b of each brake arm 48 and 48' with a portion of the outer surface 23a of the rear wheel 23 produces a braking force applied directly to this outer surface.

Upon release of the pressure applied by the rider to the brake arm 48 or 48', as the case may be, the torsion spring 50 returns the brake arm to a position where the concave inner side 15b is spaced from an outer surface 23a of the rear wheel 23. So long as the brake 15 or 46 is not actuated, the inner side 15b of each brake arm 48 and 48' is spaced from the outer surface 23a of the rear wheel 23.

Operation

The rider first adjusts the handle 17 so that the curved upper end 17b points outward towards the starboard side 16a of the board 16 for a right-handed rider or towards the port side 16b of the board 16 for a left-handed rider. It is also raised or lowered to adjust for the height of the rider, preferably being at about waist height when the rider is riding the board as shown in FIG. 1. Assuming the rider is right-handed as depicted in FIG. 1, he or she orients the front wheel 26 so that it is in-line with the rear wheel 23 and places the right foot on the surface 18 of the board 16 near the rear wheel 23. While holding the grip 17d of the handle 17 with the right hand, the rider then pushes with the left foot against the ground to start the vehicle 10 moving in a straight line and then places the left foot on the surface 18 of the board 16 near the front wheel 26. As soon as the vehicle 10 starts moving it tends to continue moving in a straight line and is stable. The rider can easily balance him or herself on the vehicle 10 as it continues to move along a straight line and at point may release his or her grasp of the handle. To turn the vehicle 10 to the right as it moves forward, the rider while standing on the board 16 moves his or her body towards the starboard side 16a to change the center of gravity of the vehicle/rider mass in a manner to rotate the yoke 24 clockwise as view in FIG. 2. To turn the vehicle 10 to the left as it moves forward, the rider while standing on the board 16 moves his or her body towards the port side 16b to change the center of gravity of the vehicle/rider mass in a manner to rotate the yoke 24 counter-clockwise as view in FIG. 2. To stop the vehicle 10, the rider while standing on the board 16 presses against the brake arm 48 with his/her right calf as discussed in connection with the brake 15 or presses against the brake arm 48' with his/her right calf and right foot as discussed in connection with the brake 46.

A Second Embodiment

Figure 10:
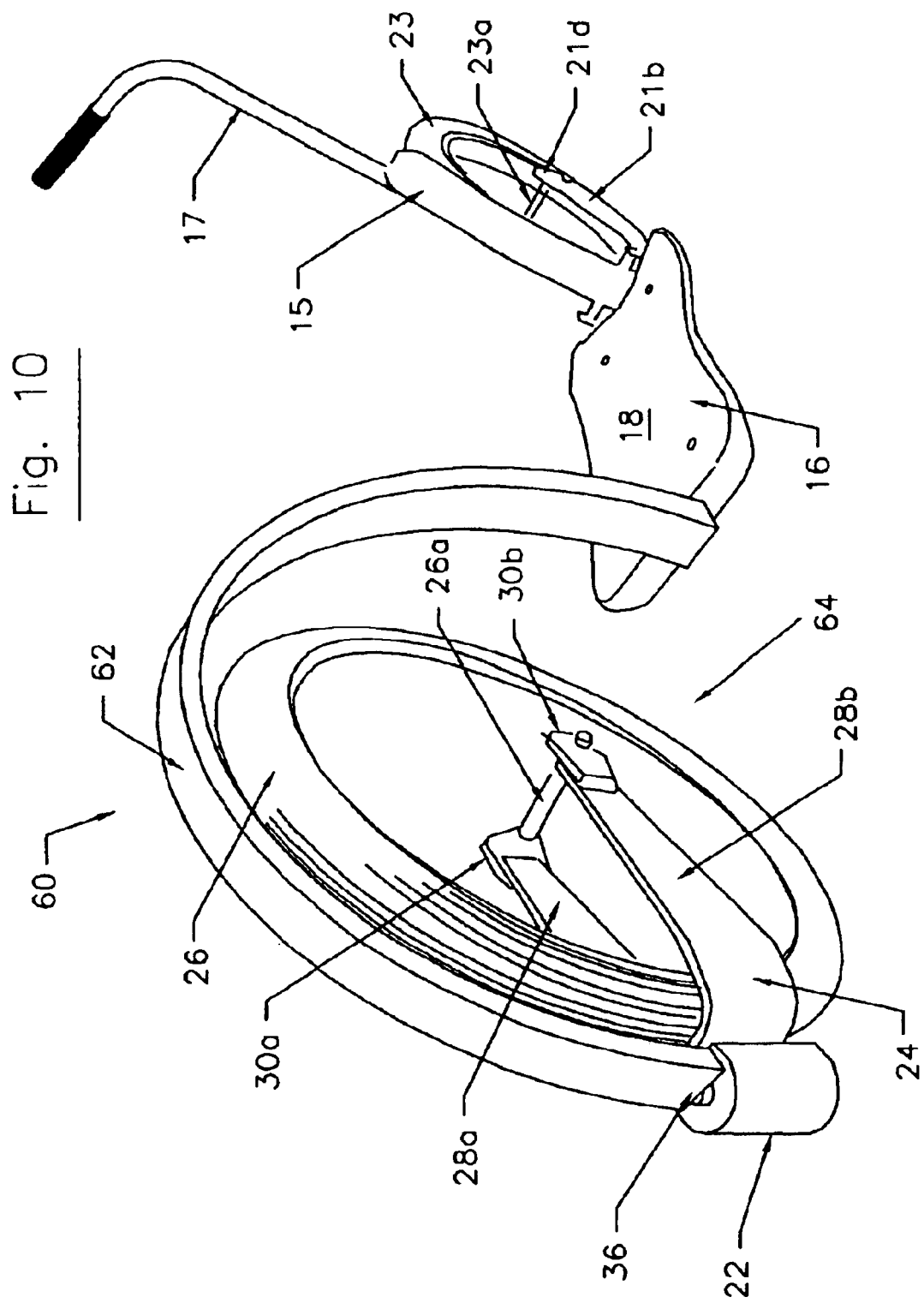
FIG. 10 is a perspective view of a second embodiment of the vehicle of this invention showing a single support arm position directly above the front wheel.

As illustrated in FIG. 10, a second embodiment of this invention, the vehicle 60, has a single rigid support arm 62 extending from the front of the vehicle. This rigid support arm 62 is directly above and in the reference plane R, and has a substantially semi-circular configuration with an open lower side 64 through which the lower portion of the front wheel 26 projects. The pivot member 22 is attached to an outboard end 62a of this support arm 62 and is constructed substantially as discussed above to enable the yoke 24 carrying the front wheel 26 to pivot and rotate as discussed, with one major exception. Namely, the yoke 24 now has a turning angle in excess of 20 degrees equally in either a clockwise or counter-clockwise direction. The pivot shell 40 fixedly attached to the outboard end 62a has its cut-away section 40b more opened, so that the opposed sides 42a and 42b that serve as stops are more widely spaced apart than depicted in connection with the first embodiment of this invention, the vehicle 10.

A Third Embodiment

Figure 11:
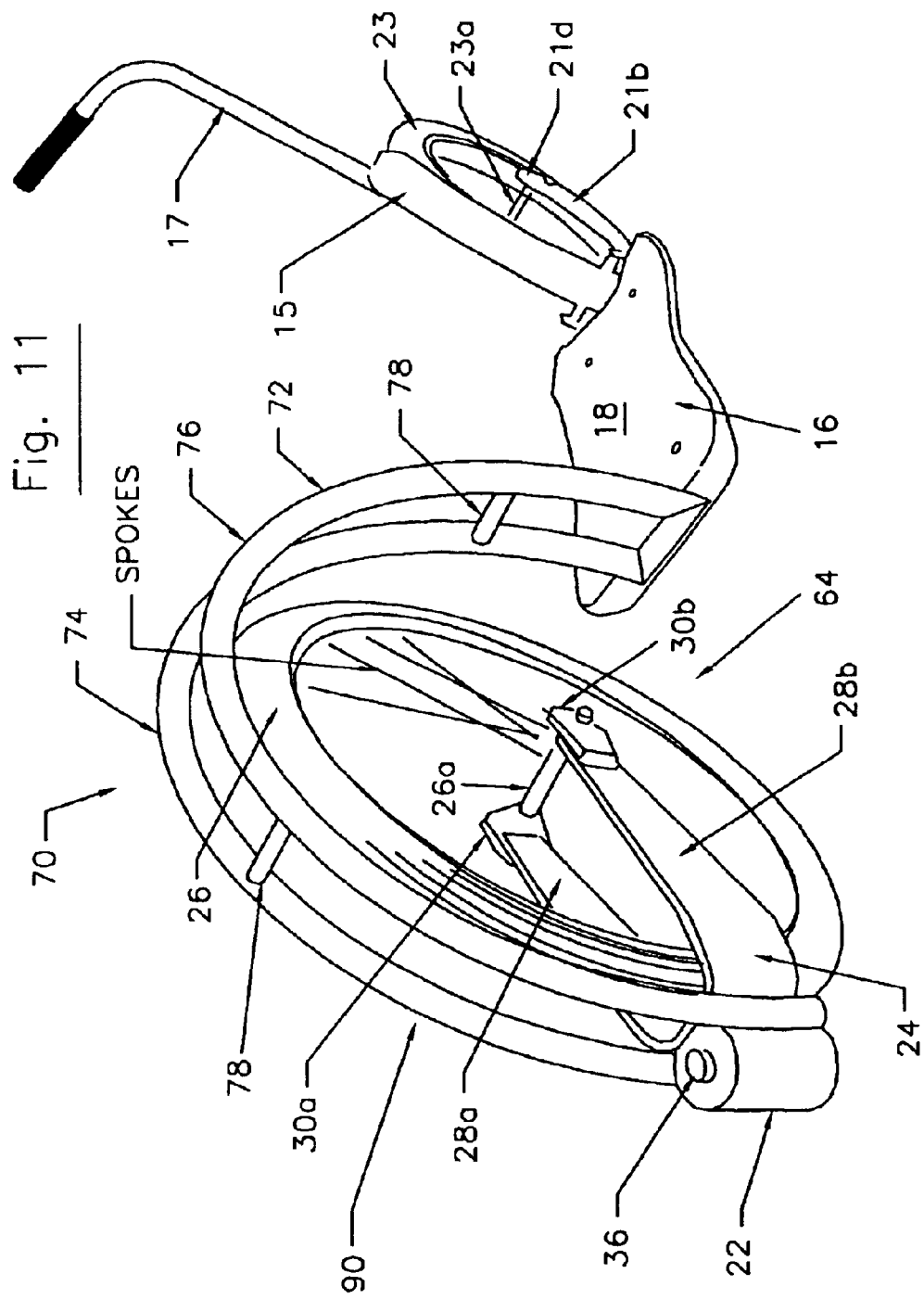
FIG. 11 is a perspective view of the third embodiment of the vehicle of this invention similar to that shown in FIG. 10 but employing a single support arm comprising multiple tubular elements.

As illustrated in FIG. 11, a third embodiment of this invention, the vehicle 70, is similar to the second embodiment depicted in FIG. 10 except it employs a single rigid support arm 72 positioned in the reference plane R like the arm 62 of the vehicle 60. The main difference between these vehicles 60 and 70 is that the rigid support arm 72 is made from a pair of tubes 74 and 76 that have a substantially semi-circular type construction and are parallel to each other. These parallel tubes 74 and 76 straddle the longitudinal axis X of the board 16 and are connected by cross ties 78.

A Fourth Embodiment

FIGS. 12 and 13 depict a fourth embodiment of this invention, the vehicle 80. This vehicle 80 is similar to the vehicle 70 shown in FIG. 11, but employs support arms 82 and 84 that are segments of equal sized octagons. The forward portions 82a and 84a, respectively, of the arms 82 and 84 are parallel. The rear portions 82b and 84b, respectively, of the arms 82 and 84 diverge outward and are connected to the front end 12a of the frame 12. These support arms 82 and 84 are connected by cross ties (not shown) in a manner similar the cross ties 78 depicted in connection with the vehicle 70 shown in FIG. 11. The embodiments employing narrow wheels 23 and 26 are best suited for on-road, hard dirt, or grass applications. The use of such wide tires 86 and 87, for example, 10 inches in width, makes the vehicle 80 particularly suited for off-road use in sand or soft dirt.

A Fifth Embodiment

A fifth embodiment of this invention, the vehicle 90, is essentially identical to the vehicle 10, with one critical exception. It employs a support arm 92 of tubular construction, and may have, for example, cross-sectional configuration that are circular, elliptical, rectangular etc. In this case, support arm 92 is a tube having a rectangular cross-sectional configuration as depicted in FIG. 15. This provides torsion bar type suspension of the front wheel 26. Consequently, when the vehicle 90 hits a road obstacle and rides over it, the energy produced by striking such an obstacle is at least partially absorbed by the torsion bar-type support arm 92. To provide such "torsion bar" suspension three criteria must be met: (1) only a single support arm is used to support the front wheel 26, (2) the support arm must be to one side of the front wheel, and (3) the support arm must be of tubular construction. The support arm 92 meets all three of these criteria. Even through the support arm 92 is tubular, it nevertheless is sufficiently rigid to support the front wheel 26.

A Sixth Embodiment

A sixth embodiment of this invention, the vehicle 96 shown in FIG. 16, also employs a single, rigid support arm 98 of tubular construction. In this embodiment the arm 98 has a cross-sectional configuration that is circular as depicted in FIG. 17. This torsion bar-type support arm 98 is oriented at an angle between 15 and 75 degrees with respect to the reference plane R that cuts through the longitudinal axis X lengthwise and is substantially at a right angle to the planar surface 18 of the board 16. In contrast to the vehicle 10 depicted in FIG. 1 where the support arm 20 is at a right angle with respect to the reference plane R, a support arm may have other angular relationships to the reference plane R. In the embodiment illustrated in FIG. 16, the support arm 98 is approximately at 45 degrees with respect to the reference plane R, providing a greater turning angle for the front wheel 26 than the right angle support arm 20 depicted in FIG. 1. Also, this angular relationships of the support arm 98 elevates it a grater distance above ground than the right angle support arm 20 depicted in FIG. 1, avoiding scraping the ground. So long as the angular relationships of the single support arm to the reference plane R positions the support arm 98 to the side of the front wheel 26, as opposed to directly above the front wheel as shown in the vehicles 60, 70, and 80, and it is tubular, a torsion bar type suspension is achieved.

A Seventh Embodiment

Figure 18:
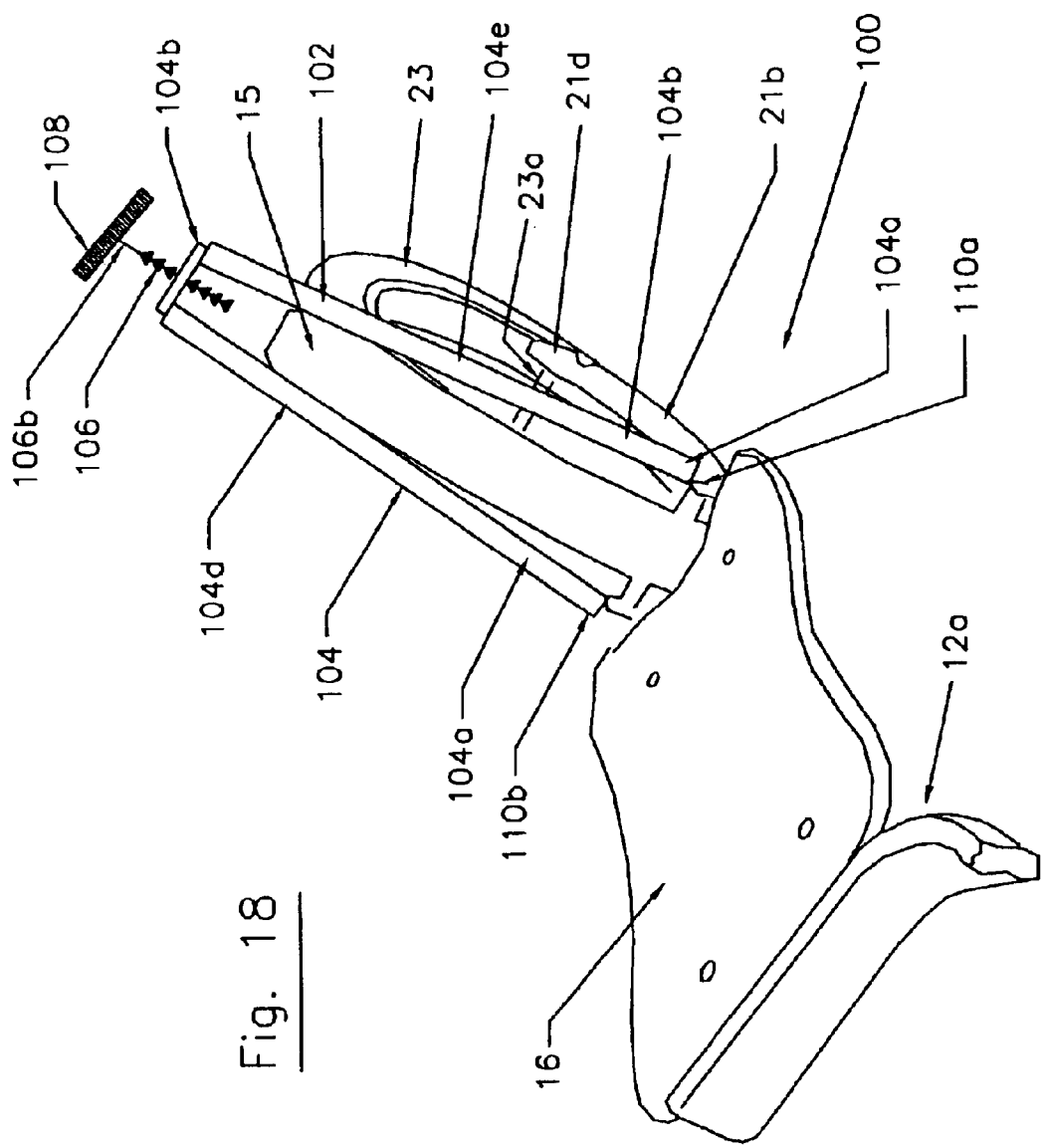
FIG. 18 is a fragmentary perspective view of the seventh embodiment of the vehicle of this invention employing a tension-type handle.

As illustrated in FIGS. 18, 18A and 18B, a seventh embodiment of this invention, the vehicle 100, employs a handle 102 designed to be pulled upward in tension. The handle 102 is near the rear wheel 23 and it includes an inverted V-shaped rigid structure 104 that has a lower end 104a pivotably attached to the frame 12 and a free end 104b forming a blunted apex. The V-shaped rigid structure 104 includes a pair of upwardly extending spaced apart arms 104c and 104d merging together at outer ends to form the free end 104b. The lower ends of each arm 104c and 104d are mounted to opposed outer edges of the frame 12 by a pivot member 110a and 110b, respectively. These two pivot members 110a and 110b are disposed along a common line that is a right angle to the longitudinal axis X of the frame 12. These pivot members 110a and 110b, and lower ends of each arm 104c and 104d, are equidistant from the longitudinal axis X at least 1 inch, ranging from 1 to 6 inches typically. A flexible, resilient cord-type member 106 extends from the free end 104b. It includes a series of rubber elements 106a enabling it to be moved to different positions to adjust its length. A crossbar 108 is attached to the outer end 106b of the cord-type member 106.

The handle 102 extends outward and upward with respect to the planar surface 18 of the board 16. It is manually moved by the rider between a stowed position shown in FIG. 18B to an in-use position shown in FIG. 18A. In the stowed position at least one of the arms, for example arm 104d, engages the rear support arm 21b which serves as a stop element. The rider grasps the crossbar 108 and pulls inward to raised the V-shaped rigid structure 104 from the stowed position to the in-use position. Upon released of the crossbar 108, the V-shaped rigid structure 104 returns to the stowed position due to gravity.

When in use, there is an upwardly directed force at the opposed outer edges of the frame 12. The rider, while standing with only one foot on the board 16 intersecting the longitudinal axis X, pulls upward on the cord-type member 106 and simultaneously pushes downward with the one foot against the surface 18 of the board 16, increasing the pressure between the one foot and the board 16. This creates automatically a restoring moment that resists a tipping moment in either direction. Once the vehicle 100 is moving, the rider releases his or her grasp of the handle 102, returning it to the stowed position.

An Eighth Embodiment

Figure 19:
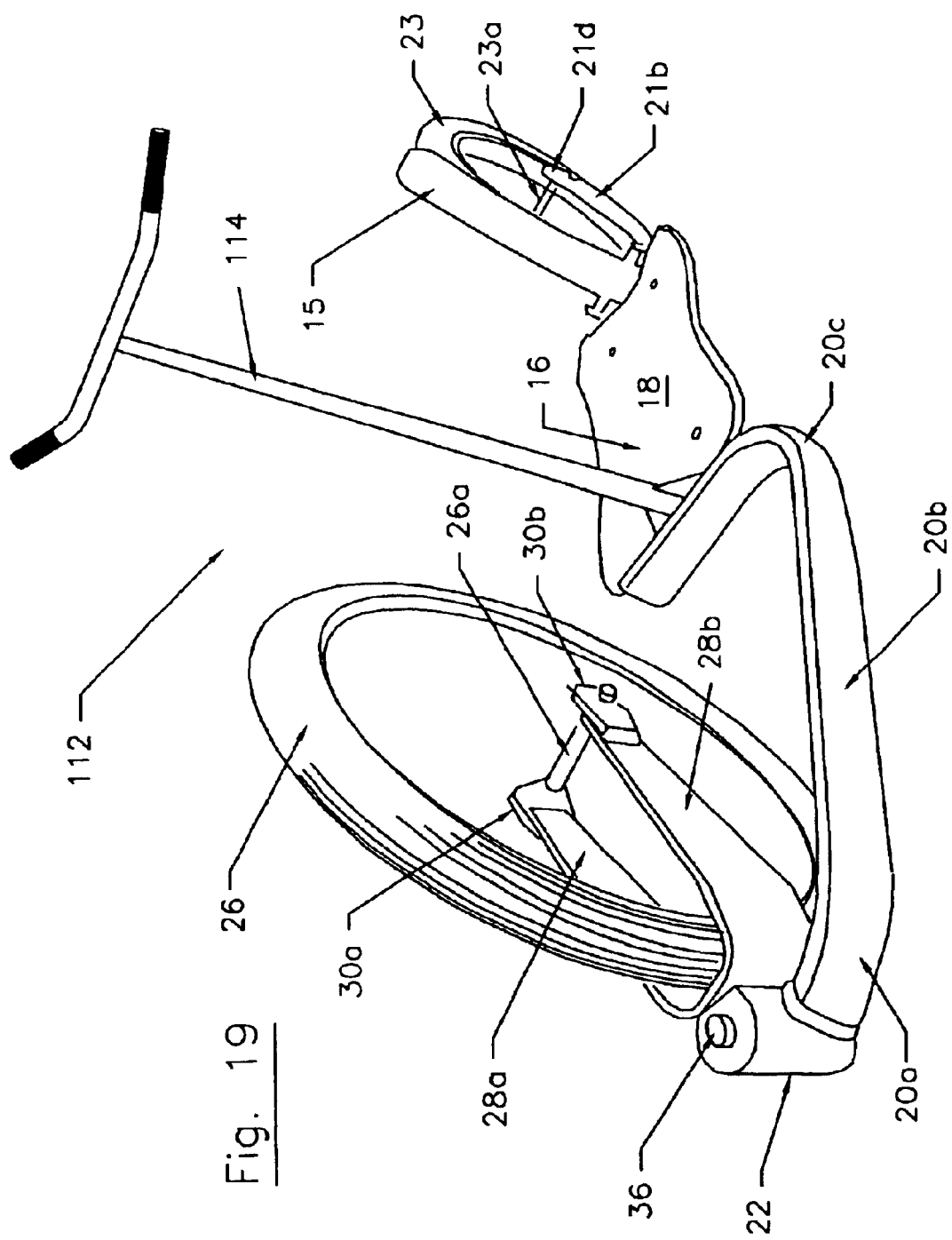
FIG. 19 is the eighth embodiment of the vehicle of this invention showing a wheel board vehicle similar to that depicted in FIG. 1 except a T shaped handle is mounted near the front wheel of the vehicle.

As illustrated in FIG. 19, an eighth embodiment of this invention, the vehicle 112, is similar that of the first embodiment but a T-shaped handle 114 is mounted in an immovable position near the front wheel 26. This handle may be mounted so that is height can be increased or decreased.

A Ninth Embodiment

Figure 20:
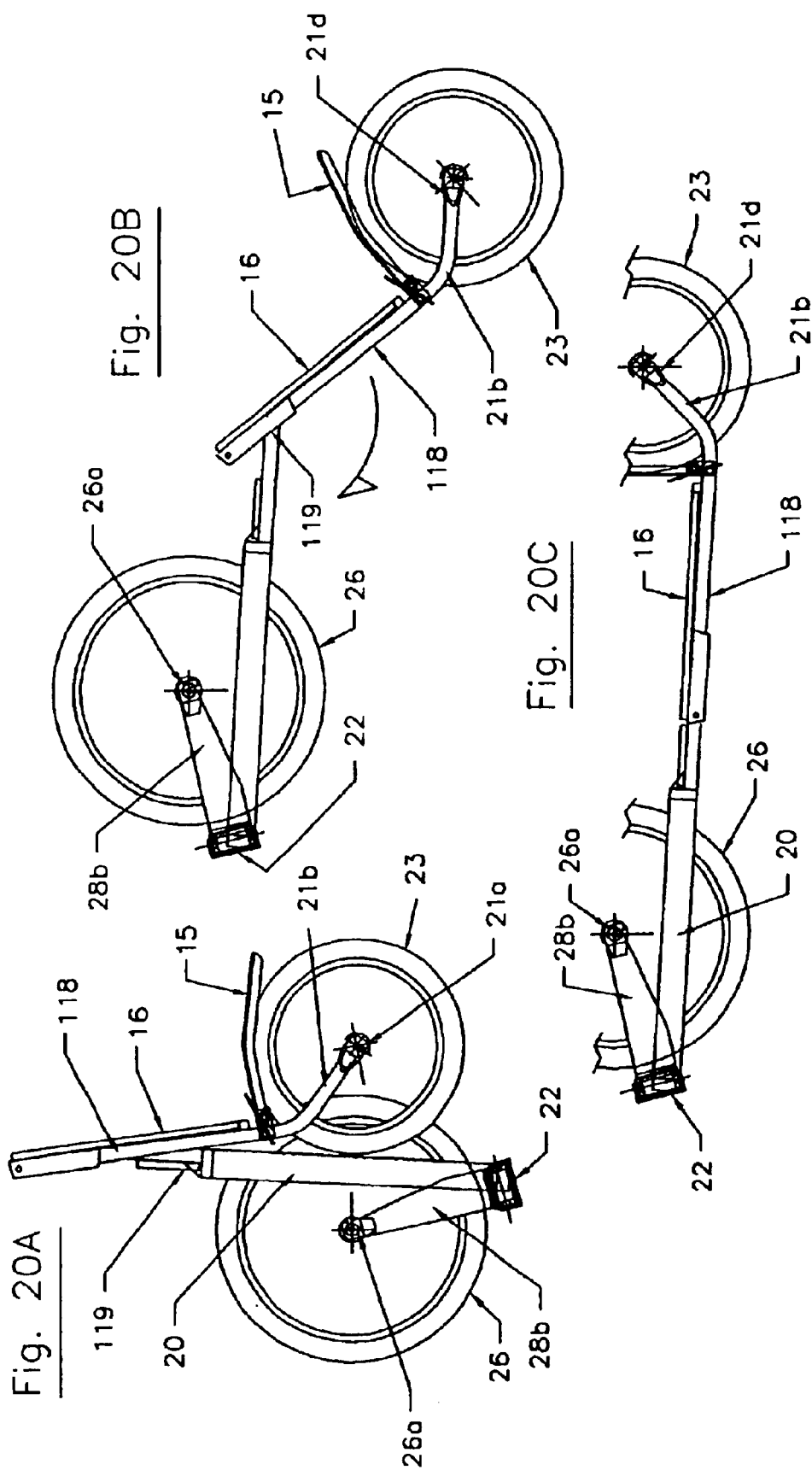
FIGS. 20A through 20C depict the ninth embodiment of the vehicle of this invention showing a wheel board vehicle that is collapsible, with FIG. 20A being a side view showing this vehicle in the collapsed position, FIG. 20B being a side view showing this vehicle partially extended, and FIG. 20C being a side view showing this vehicle completely extended.

FIGS. 27A–27C depict a ninth embodiment of this invention, the vehicle 116. This vehicle 116 employs a frame 118 designed to be collapsed into a folded position as depicted in FIG. 20A. An intermediate portion of the frame 118 includes a pivot member 119 attaching the support arm 20 pivotally to the underside of the frame 118 to allow the frame to be extended. From the collapsed position shown in FIG. 20A, the frame 118 is moved from a partially extended position as depicted in FIG. 20B into a fully extended position depicted in FIG. 20C where the board 16 is between the front wheel 26 and rear wheel 23.

Guide Mechanism

As illustrated in FIGS. 24, 24A, 25, and 25B, the wheel board vehicle of this invention may include a guide mechanism 120, which initially maintains the vehicle moving in a straightforward direction. This guide mechanism 120 may be used in place of a handle at start-up. This guide mechanism 120 prevents the front yoke 24 from pivoting and orients the front wheel 26 to move the vehicle in a straight line. The guide mechanism 120 includes a board 122 having a manually moveable front section 112a near the front wheel 26. This moveable front section 112a serves an actuating member for engaging and disengaging the guide mechanism 120. When the actuating member is engaged, the front wheel 26 and rear wheel 23 are maintained in-line. When disengaged, the front wheel 26 is allowed to turn in either direction, clockwise or counter-clockwise.

The guide mechanism 120 includes a guide arm 124 that is fixedly attached to the front yoke 24 and moves with the yoke when the yoke pivots. The guide arm 124 extends radially along one side of the front wheel, in this case, on the same side as the support arm 20, pointing in a direction towards the moveable front section 122a of the board 122 when the guide mechanism is engaged. The guide arm 124 has an inner end 124a attached to the yoke 24 and a free terminal end 124b. A U-shaped stop or holding element 126 is mounted centrally along an outer front edge E10 of the moveable front section 122a. The front section 122a is attached to the rear section 122b of the board 122 to pivot about a pivot element 128. A torsion spring 130 is wrapped around the pivot element 128 and normally urges the front section 122a into an upward position as depicted in FIGS. 24 and 24A. When the front and rear wheels are in line, the free terminal end 124b of the guide arm 124 is between the bite of the U-shaped holding element 126 as best shown in FIG. 24A. When the rider steps down on the front section 122a, it is moved to the position depicted in FIGS. 25 and 25A, disengaging the guide mechanism 120, allowing the yoke 24 to pivot and the front wheel 26 to turn, as best illustrated in FIG. 25A. When the rider steps off the front section 122a, the spring 130 returns the front section to the elevated position depicted in FIG. 24. Provided the front wheel 26 and rear wheel 23 are in-line, the free terminal end 124b of the guide arm 124 will again fit between the bite of the U-shaped holding element 126.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention.

What is claimed is:

1. A wheel board vehicle including a frame having an intermediate portion including a board on which a rider stands while riding the vehicle, a front end from which extends only a single support arm having an outboard end to which a front yoke is pivotably attached, said front yoke carrying a front wheel, and a rear end carrying a rear wheel where the support arm is to one side of the front wheel and positioned to enable the yoke to rotate through a turning angle of at least 13 degrees in both clockwise and counter-clockwise directions, and the vehicle includes stops members positioned so that the maximum turning angle of the yoke is the same in both said directions.

2. A wheel board vehicle including a frame having an intermediate portion including a board on which a rider stands while riding the vehicle, a front end from which extends only a single support arm having an outboard end to which a front yoke is pivotably attached, said front yoke carrying a front wheel, and a rear end carrying a rear wheel where the board has a substantially planar surface, the frame has a central longitudinal axis, and the support arm is in a plane that is at an angle between 15 and 75 degrees with respect to a reference plane that cuts through said longitudinal axis lengthwise and is substantially at a right angle to the planar surface of the board.

3. A wheel board vehicle including
a frame having
an intermediate portion including a board on which a rider stands while riding the vehicle, and
a front end from which extends a single support arm having an outboard end, and
a rear end from which extend stationary support members carrying a rear wheel,
a pivot member at the outboard end of the support arm,
a front yoke attached to the pivot member for rotation laterally, said front yoke carrying a front wheel that is turned as the front yoke is rotated by a rider while standing on the board moving his or her body to change the center of gravity of the vehicle/rider mass,
said single support arm positioned to enable the yoke to rotate through a turning angle of at least 13 degrees in both clockwise and counter-clockwise directions, and
stops members positioned so that the maximum turning angle of the yoke is the same in both said directions.

4. The vehicle according to claim 3 including a manually operated brake member attached to the frame near the rear wheel adjacent a leg of the rider while the rider is riding the vehicle.

5. The vehicle according to claim 4 where the brake member includes
an arm element having a first end pivotably attached to the frame and a free end that moves into engagement with the rear wheel upon the rider, while riding the vehicle, manually actuating the brake member, and
a spring member that normally moves the arm element into a position where the free end is disengaged from the wheel.

6. The vehicle according to claim 5 where the arm element has a pad at the free end on a side of the arm element that faces away from the rear wheel, said arm element being sufficiently long so that the pad engages a calf of a leg of the rider while the rider is riding the vehicle, said rider manually actuating the brake member by pressing the calf against the pad, said pad being made of a resilient material that enable the rider to apply said braking force in a controlled manner, increasing or decreasing said force progressively.

7. The vehicle according to claim 6 where the pad has a concave surface facing the calf of the rider while said rider is riding the vehicle.

8. The vehicle according to claim 5 where the arm element has a foot pedal that includes a pivot member attached to the frame in a manner that allows the rider to apply a braking force to the rear wheel by standing on the pivot member to cause the free end of the arm element to engage the rear wheel.

9. The vehicle according to claim 3 where the support arm is of tubular construction.

10. The vehicle according to claim 3 where the support arm is positioned above the front wheel to enable rotation of the yoke in excess of 20 degrees in either direction.

11. The vehicle according to claim 3 including a handle attached to the frame in an immovable, generally upright orientation while a rider rides the vehicle.

12. The vehicle according to claim 3 where
the support arm is positioned above the front wheel,
the board has a substantially planar surface,
the frame has a central longitudinal axis, and
the support arm is in a reference plane that cuts through said longitudinal axis lengthwise and that is substantially at a right angle to the planar surface of the board.

13. The vehicle according to claim 3 where
the board has a substantially planar surface,
the frame has a central longitudinal axis, and
the support arm is in a plane that is at an angle between 15 and 75 degrees with respect to a reference plane that cuts through said longitudinal axis lengthwise and is substantially at a right angle to the planar surface of the board.

14. A wheel board vehicle including
a frame having a central longitudinal axis and only two wheels mounted thereon,
said frame having
an intermediate portion including a board on which a rider stands while riding the vehicle,
a front end from which extends only a single support arm of tubular construction having an outer end to which a front yoke carrying a front wheel is attached by a pivot member that is along the central longitudinal axis, and
a rear end from which extend stationary support members carrying a rear wheel,
said yoke pivoting about said pivot member through a turning angle of at least 13 degrees equally in either a clockwise or counter-clockwise direction in response to the rider while standing on the board moving his or her body to change the center of gravity of the vehicle/rider mass,
said front yoke having a free end pointing inward toward the board generally in the same direction as the central longitudinal axis when the vehicle is moving in a straight line so that both wheel are in-line, and
a manually operated brake member attached to the frame near the rear wheel adjacent a leg of the rider while the rider is riding the vehicle, and
a handle attached to the frame in an immovable, generally upright orientation while a rider rides the vehicle.

15. The vehicle according to claim 14 where the support arm is positioned to one side of the front wheel.

16. The vehicle according to claim 15 where the support arm is positioned above the front wheel to enable rotation of the yoke in excess of 20 degrees in either direction.

* * * * *